US012122173B2

(12) United States Patent
Kim et al.

(10) Patent No.: US 12,122,173 B2
(45) Date of Patent: Oct. 22, 2024

(54) METHOD AND DEVICE FOR DIGITAL PRINT IMAGE-CONNECTING CONTINUOUS PRINTING FOR HIDING STITCHING LINE

(71) Applicant: KNS Retail Co., Ltd., Gwacheon-si (KR)

(72) Inventors: Yong Tae Kim, Seongnam-si (KR); Sun Hwi Lee, Seongnam-si (KR)

(73) Assignee: KNS Retail Co., Ltd., Gwacheon-si (KR)

( * ) Notice: Subject to any disclaimer, the term of this patent is extended or adjusted under 35 U.S.C. 154(b) by 0 days.

(21) Appl. No.: 18/278,019

(22) PCT Filed: Feb. 17, 2022

(86) PCT No.: PCT/KR2022/002365
§ 371 (c)(1),
(2) Date: Aug. 21, 2023

(87) PCT Pub. No.: WO2022/177324
PCT Pub. Date: Aug. 25, 2022

(65) Prior Publication Data

US 2024/0140121 A1 May 2, 2024

(30) Foreign Application Priority Data

Feb. 22, 2021 (KR) ........................ 10-2021-0023727

(51) Int. Cl.
*B41J 2/21* (2006.01)
*B41M 3/00* (2006.01)

(52) U.S. Cl.
CPC .................................. *B41M 3/008* (2013.01)

(58) Field of Classification Search
CPC .......... B41M 1/06; B41M 1/30; B41M 3/008; B41M 5/03; B41M 5/0256; B41J 2/01;
(Continued)

(56) References Cited

U.S. PATENT DOCUMENTS

2017/0015119 A1 1/2017 Liang

FOREIGN PATENT DOCUMENTS

JP 06143787 A 5/1994
JP 2000-015887 A 1/2000
(Continued)

OTHER PUBLICATIONS

International Search Report for PCT/KR2022/002365 mailed Jun. 3, 2022 from Korean Intellectual Property Office.

*Primary Examiner* — Christopher E Mahoney
*Assistant Examiner* — Marissa Ferguson-Samreth
(74) *Attorney, Agent, or Firm* — Revolution IP, PLLC

(57) ABSTRACT

A device and a method for digital print image-connecting continuous printing according to an embodiment of the present invention comprise: an un-winder roll for un-winding printing fabric; a re-winder roll for winding the printing fabric on which printing has been completed; a printing engine provided between the un-winder roll and the re-winder roll, and including a blanket rotating while being in contact with a photo imaging plate and a print roller rotating while being in contact with the blanket; and a fabric direction switching mechanism for switching a transfer direction of the printing fabric passing between the blanket and the print roller into a forward direction or a reverse direction, wherein the printing engine prints a first divided image including a first overlapping area on a first fabric of the printing fabric when the transfer direction is the forward direction, locates only the first overlapping area printed on the first fabric under a second fabric of the printing fabric when the transfer direction is the reverse direction, and prints a second divided image including a second overlapping area on the second fabric to generate a unit image in which the first overlapping area and the second overlapping
(Continued)

area overlap each other when the transfer direction is the forward direction.

10 Claims, 32 Drawing Sheets

(58) Field of Classification Search
CPC ...... B41J 2/2132; B41J 3/4073; B41J 15/165; B41J 2002/012
See application file for complete search history.

(56) References Cited

FOREIGN PATENT DOCUMENTS

| | | | |
|---|---|---|---|
| JP | 2016-539021 | A | 12/2016 |
| KR | 10-2011-0055027 | A | 5/2011 |
| KR | 10-2014-0047446 | A | 4/2014 |
| KR | 10-1643854 | B1 | 8/2016 |
| KR | 10-2024026 | B1 | 9/2019 |
| KR | 10-2020-0004211 | A | 1/2020 |

【FIG. 1】
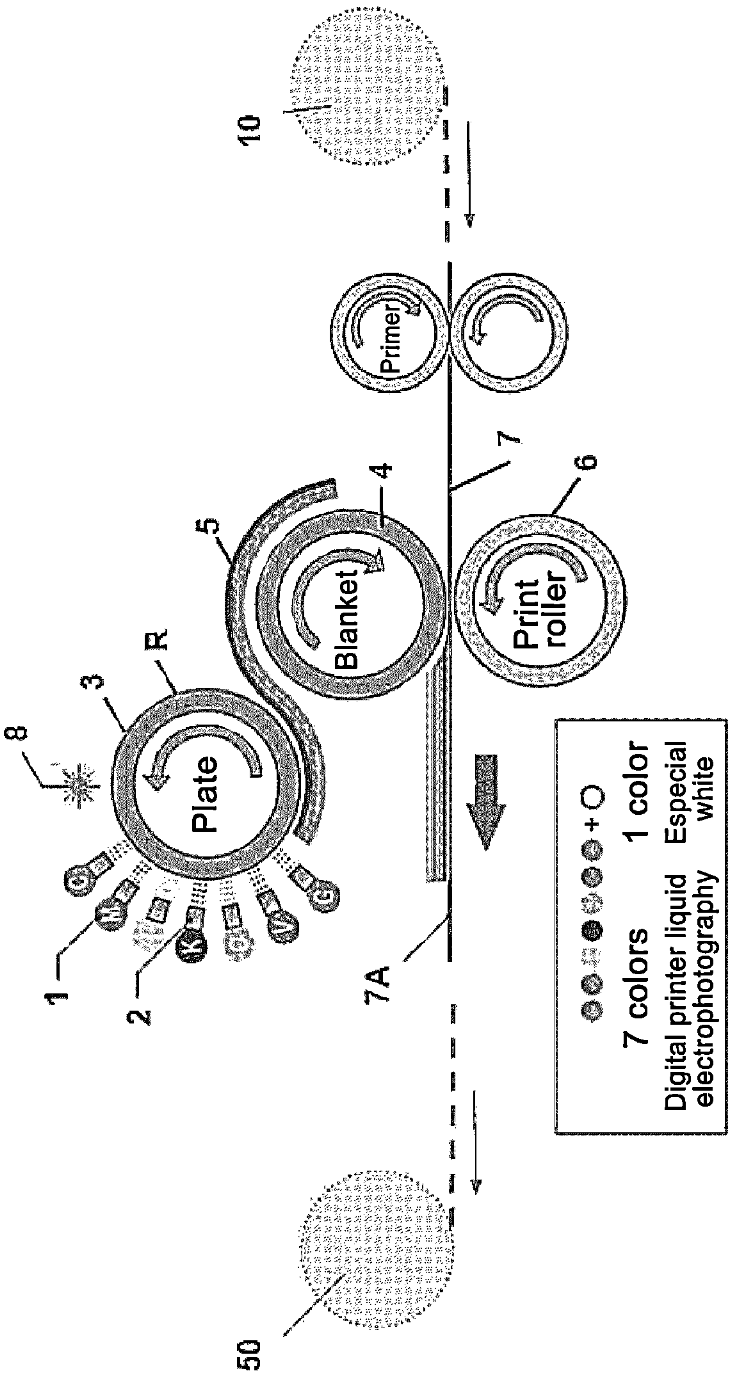

【FIG. 2】
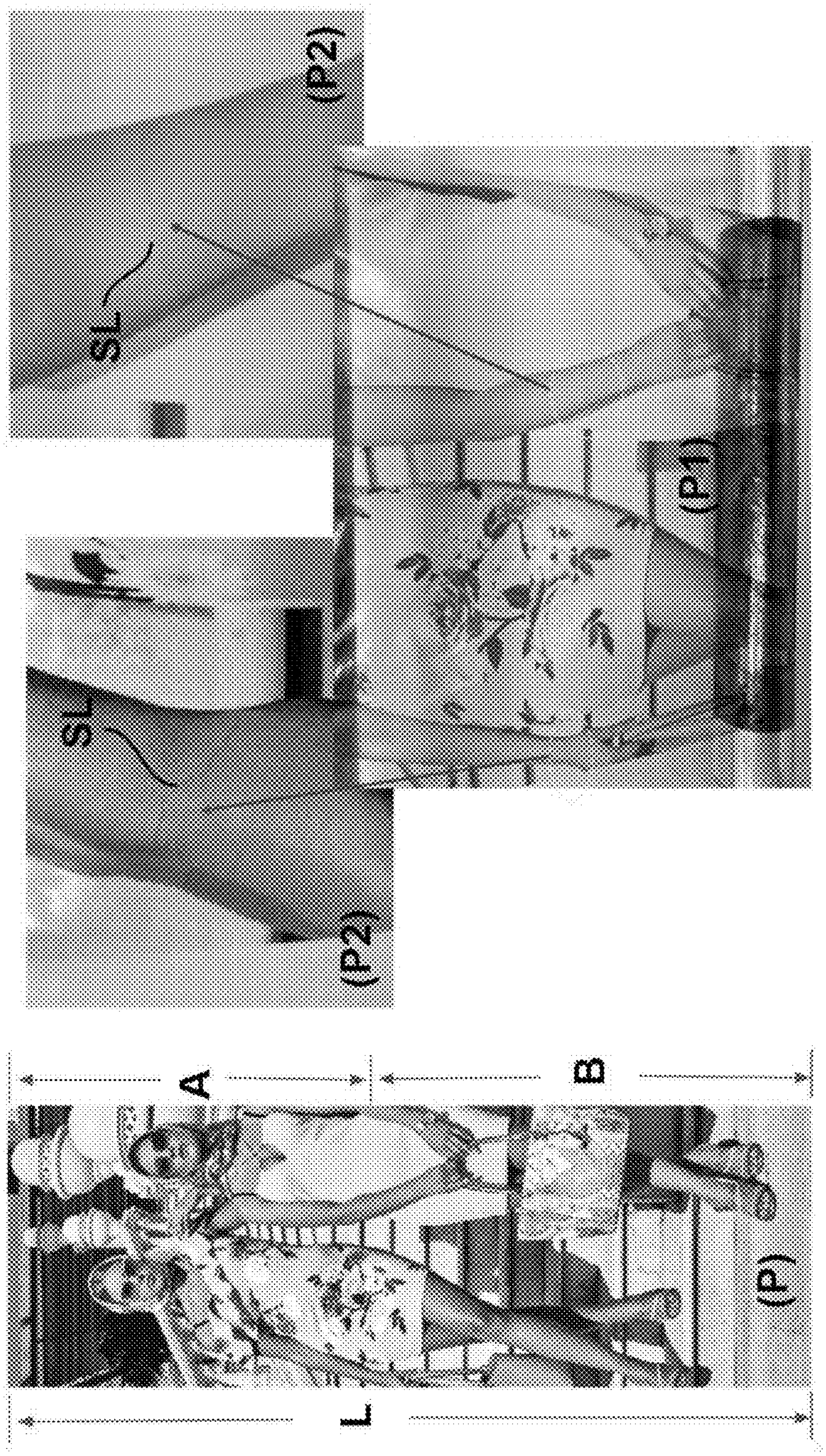

【FIG. 3】

【FIG. 4】
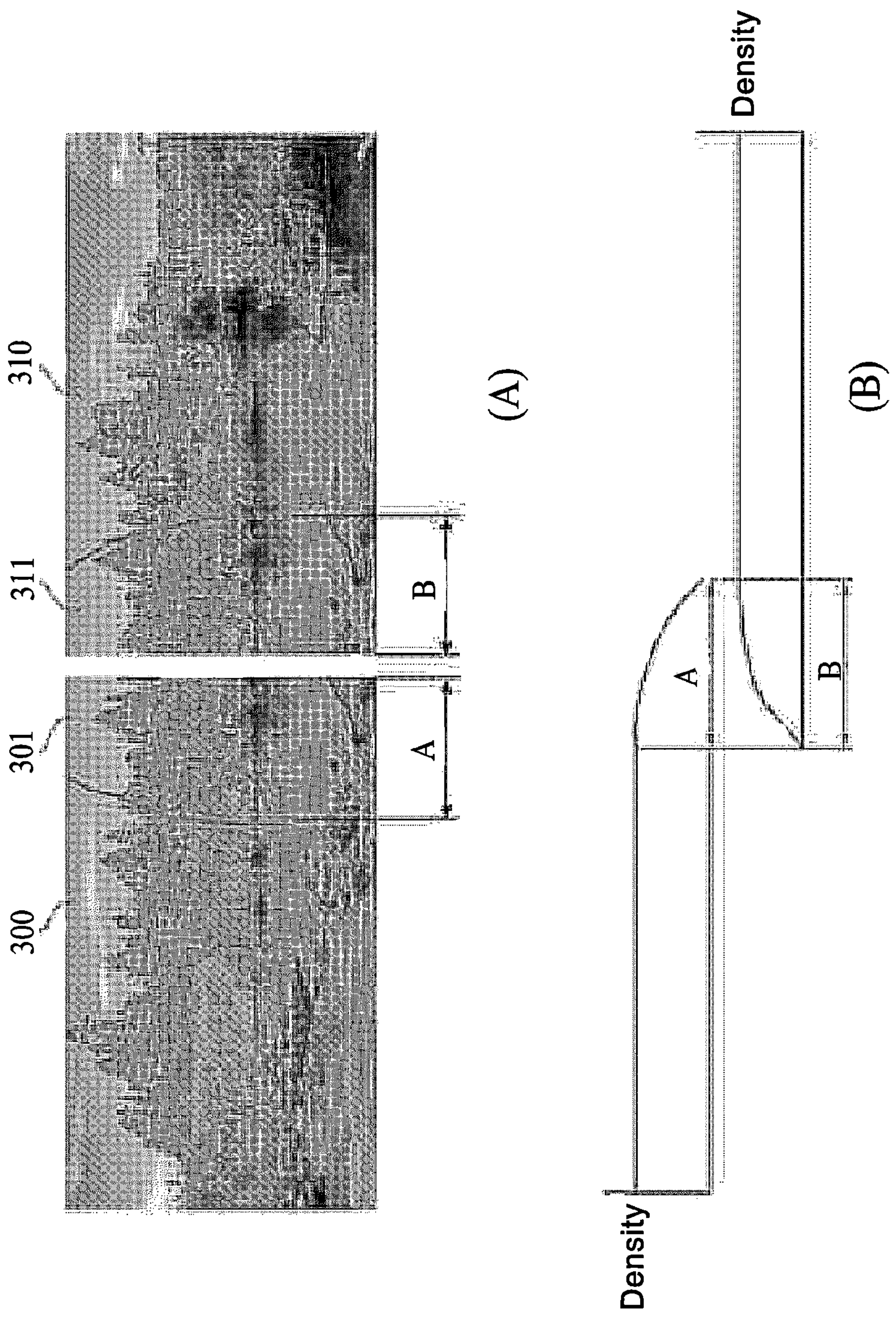

【FIG. 5】
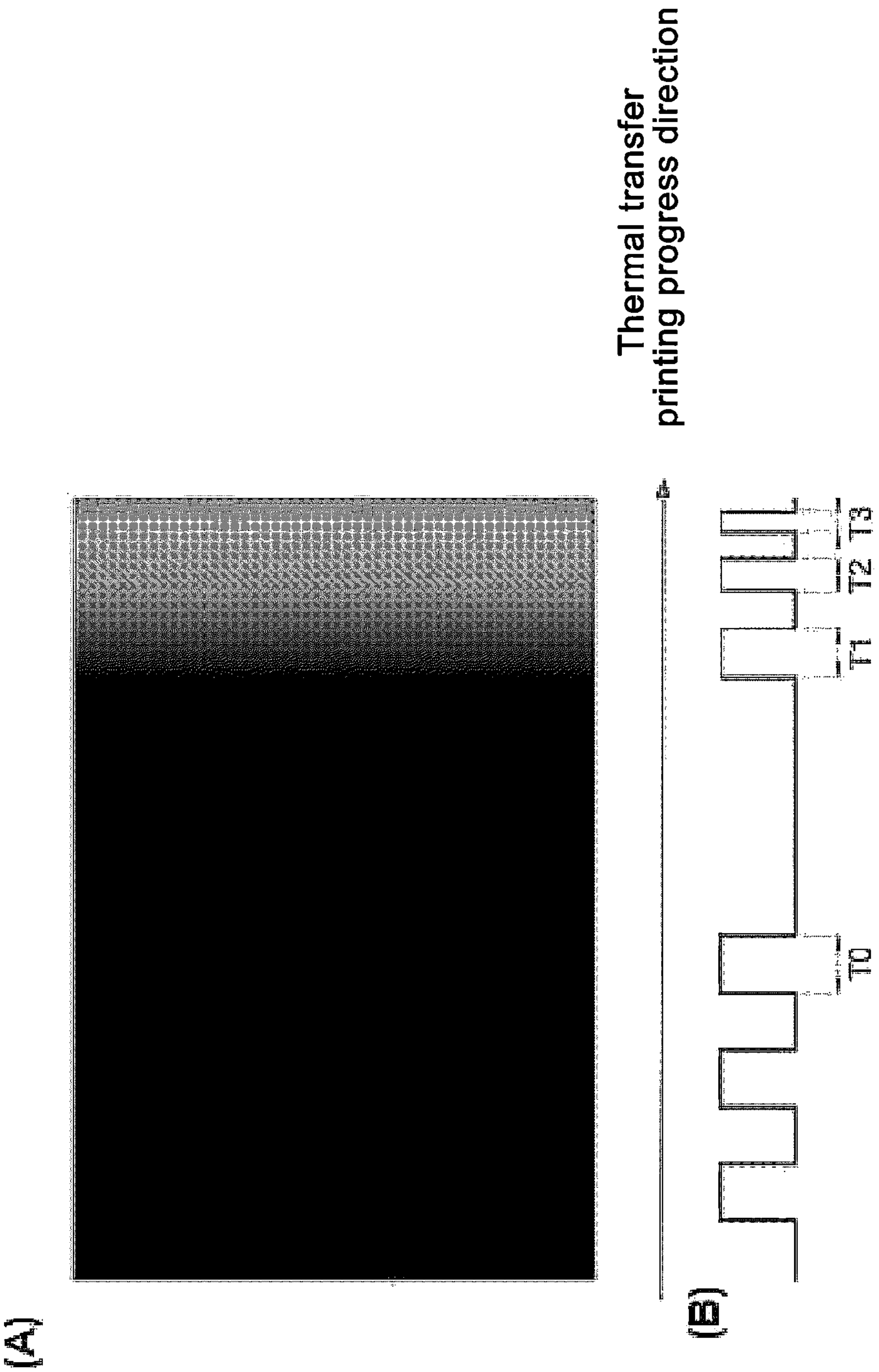

【FIG. 6】
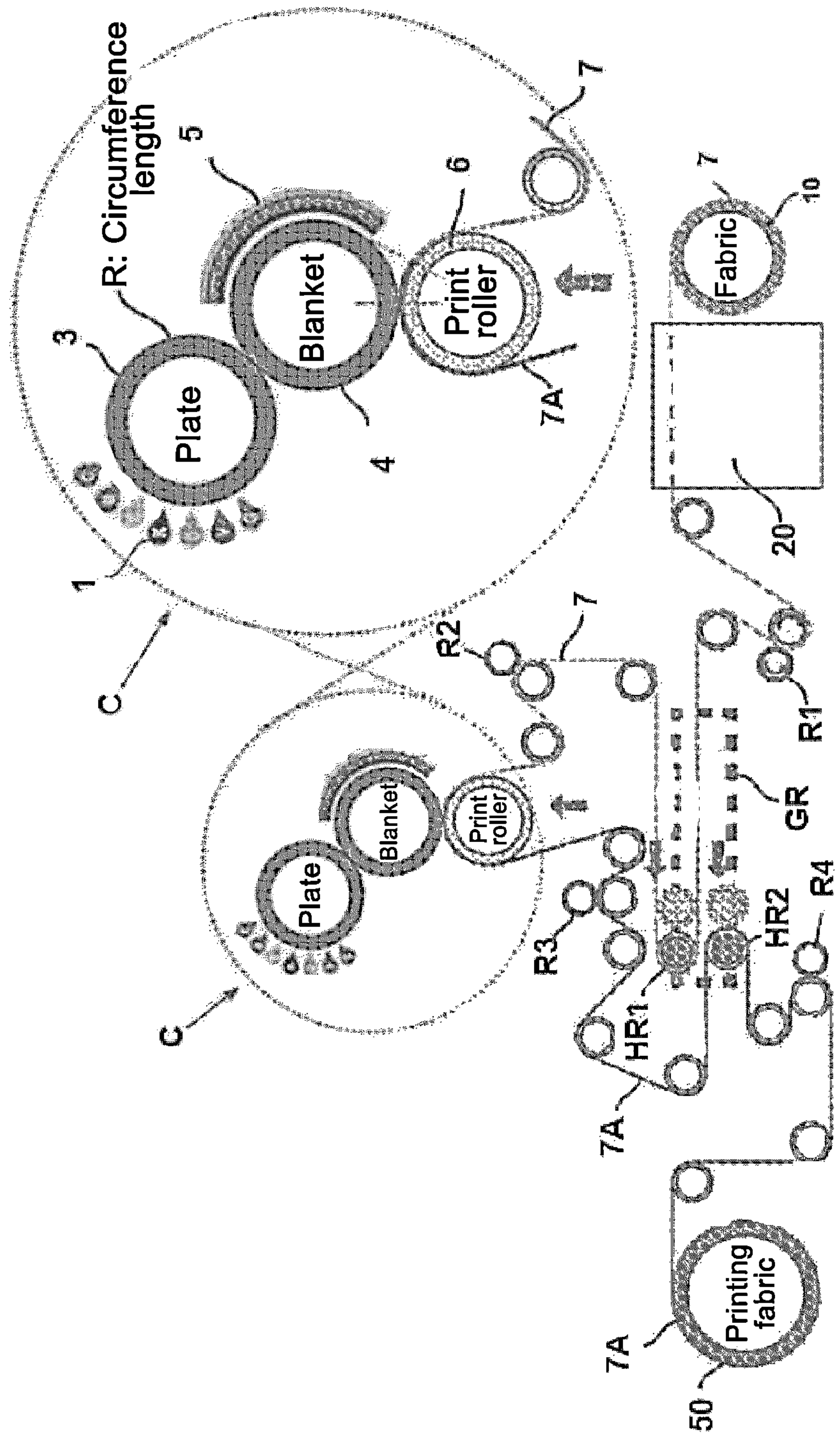

【FIG. 7】
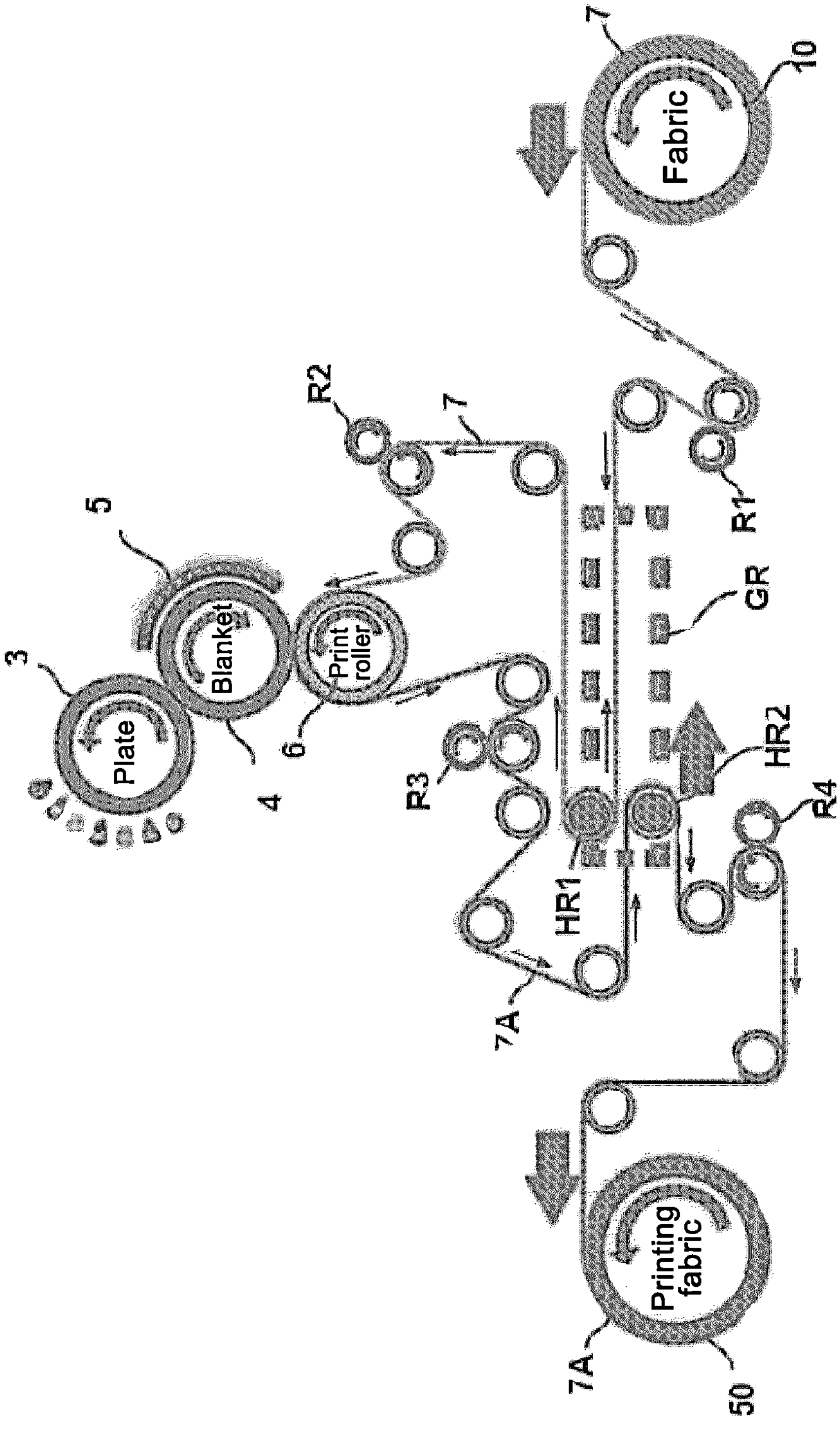

【FIG. 8】
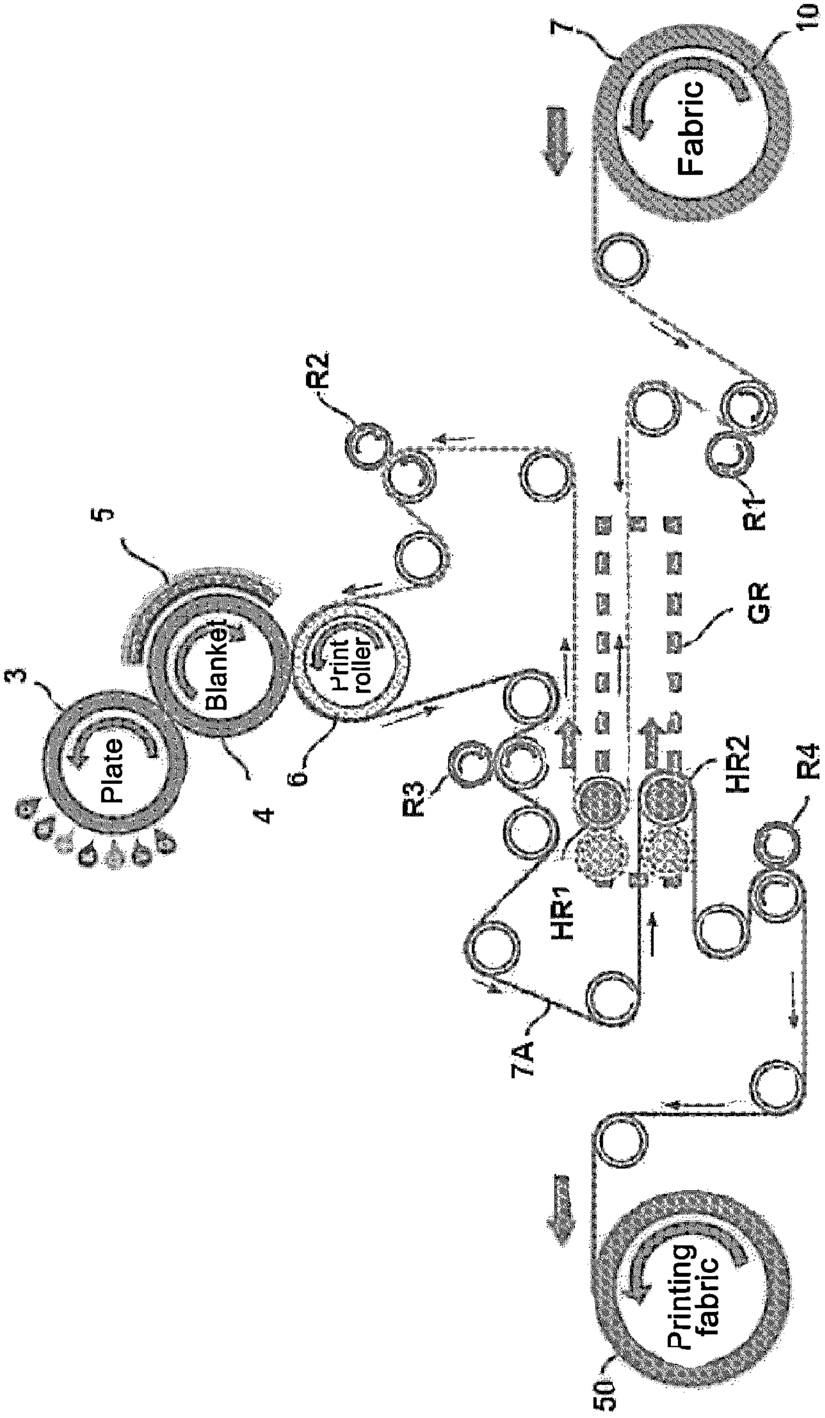

【FIG. 9】
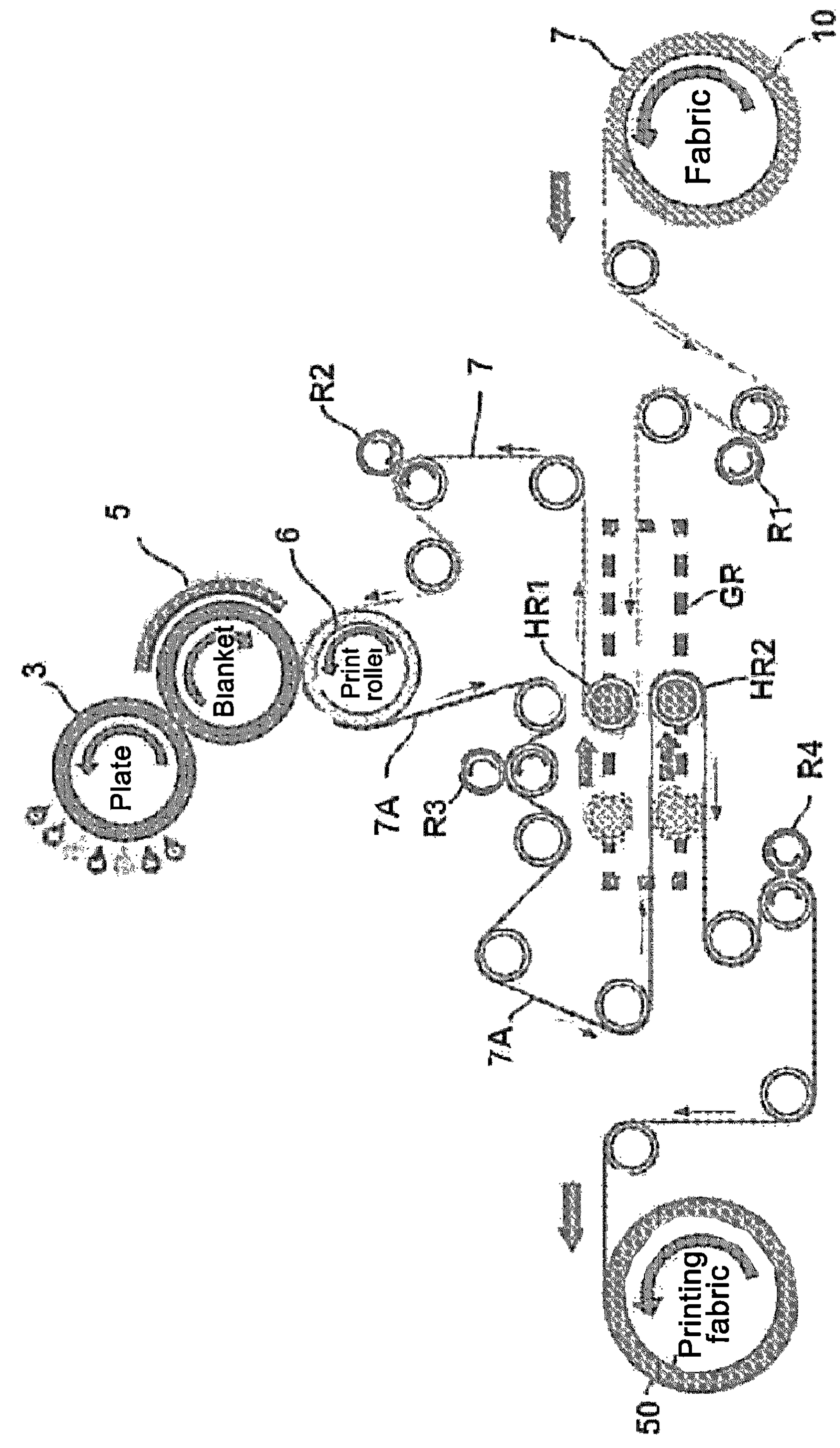

【FIG. 10】
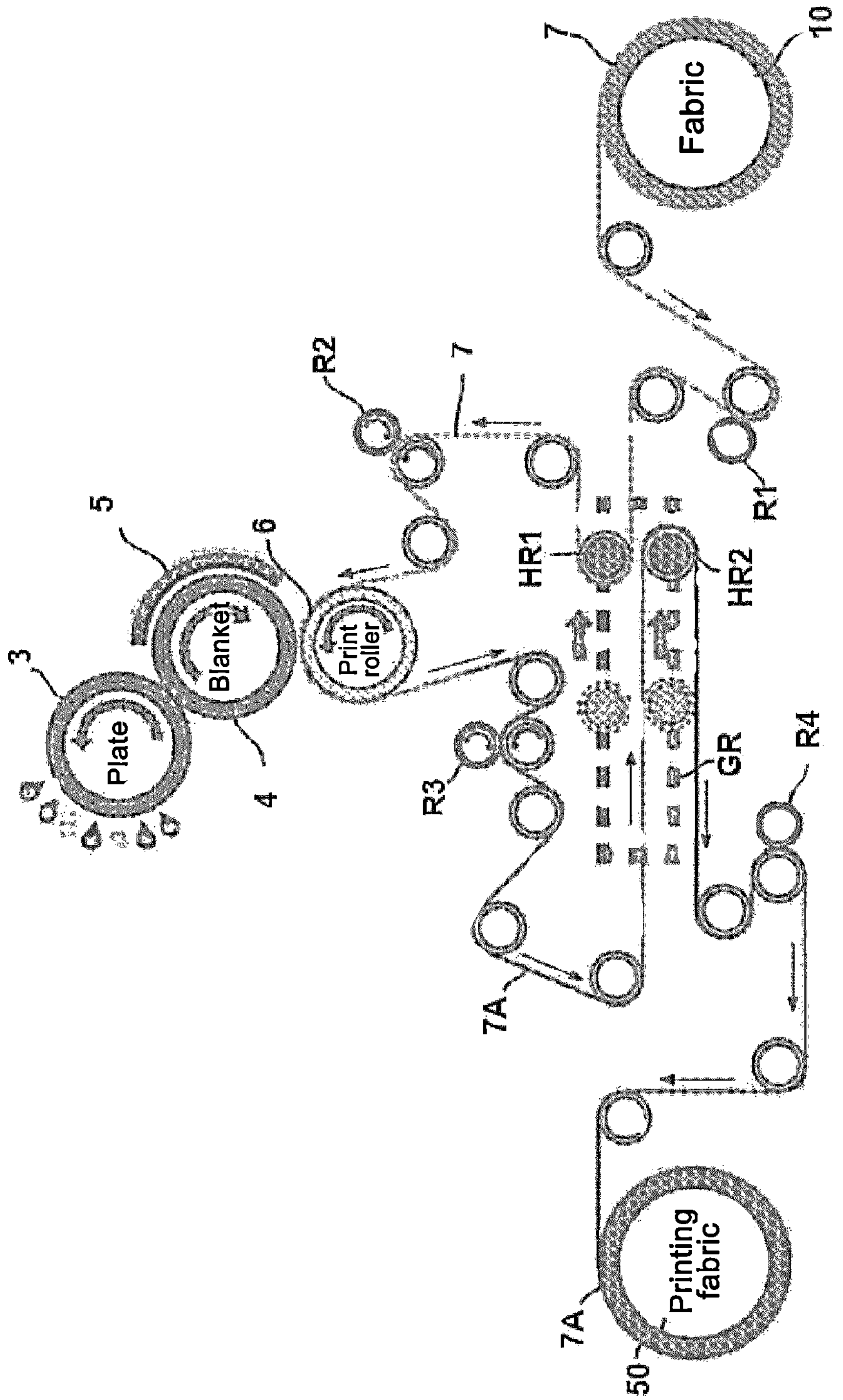

【FIG. 11】
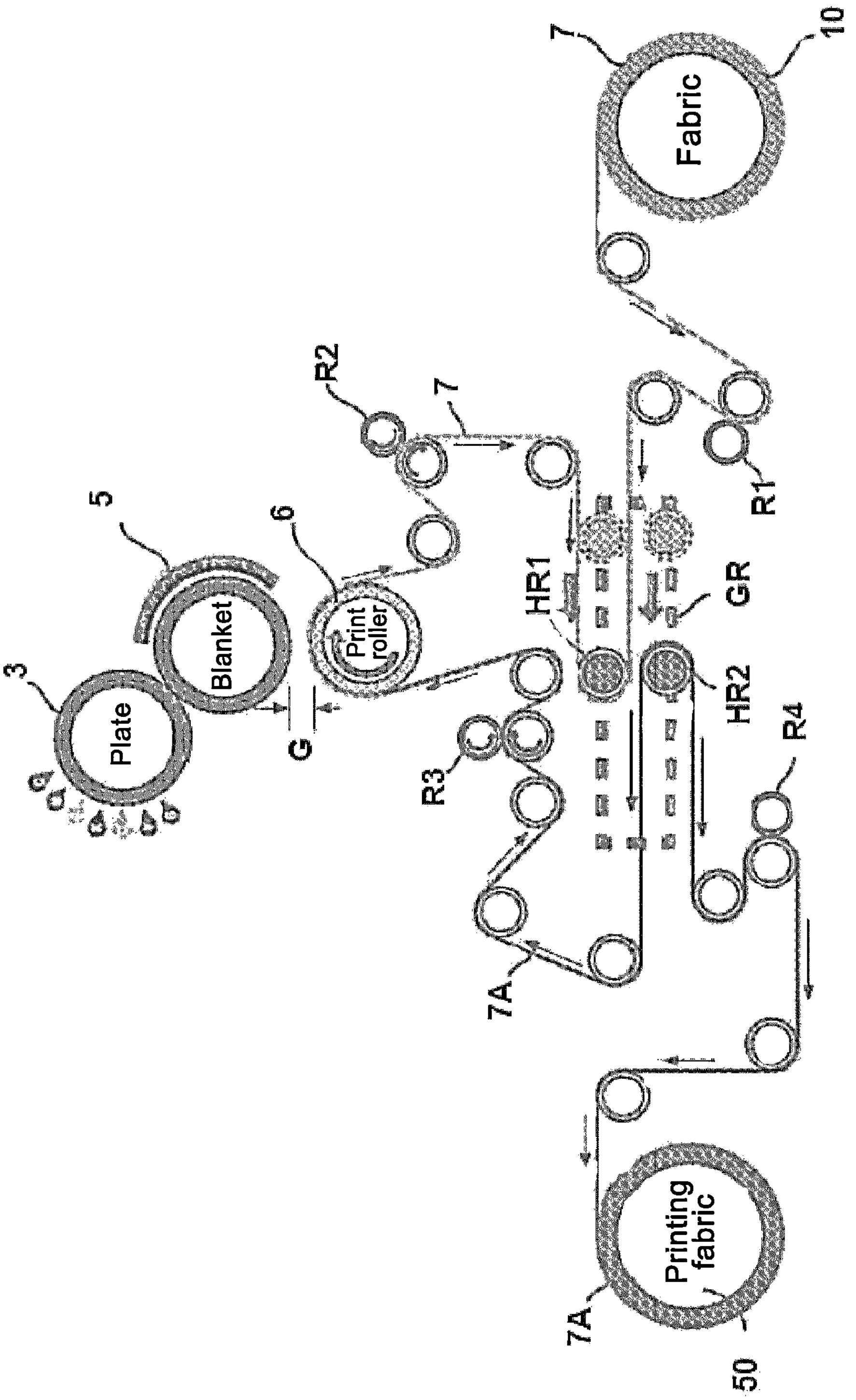

【FIG. 12】
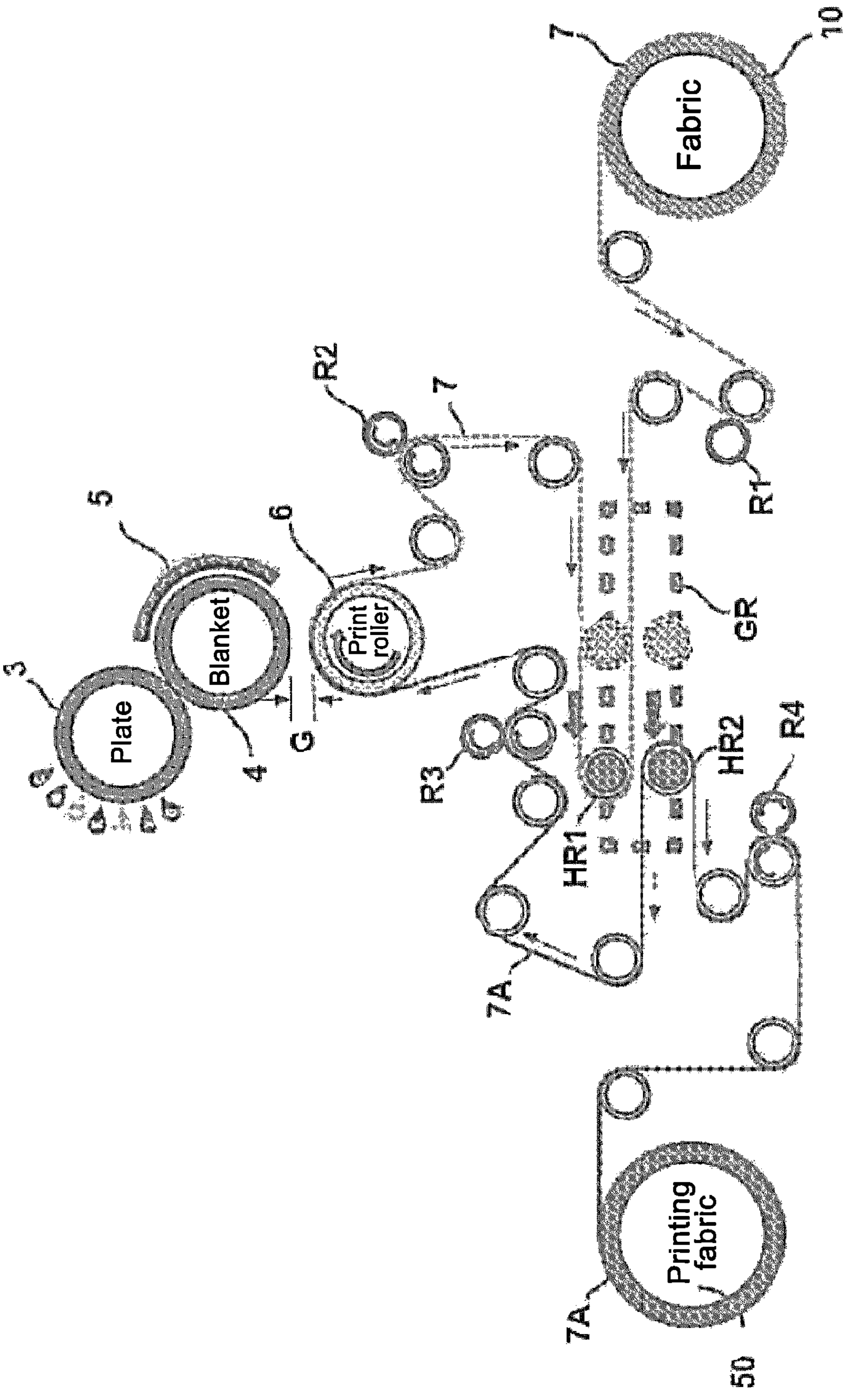

【FIG. 13】
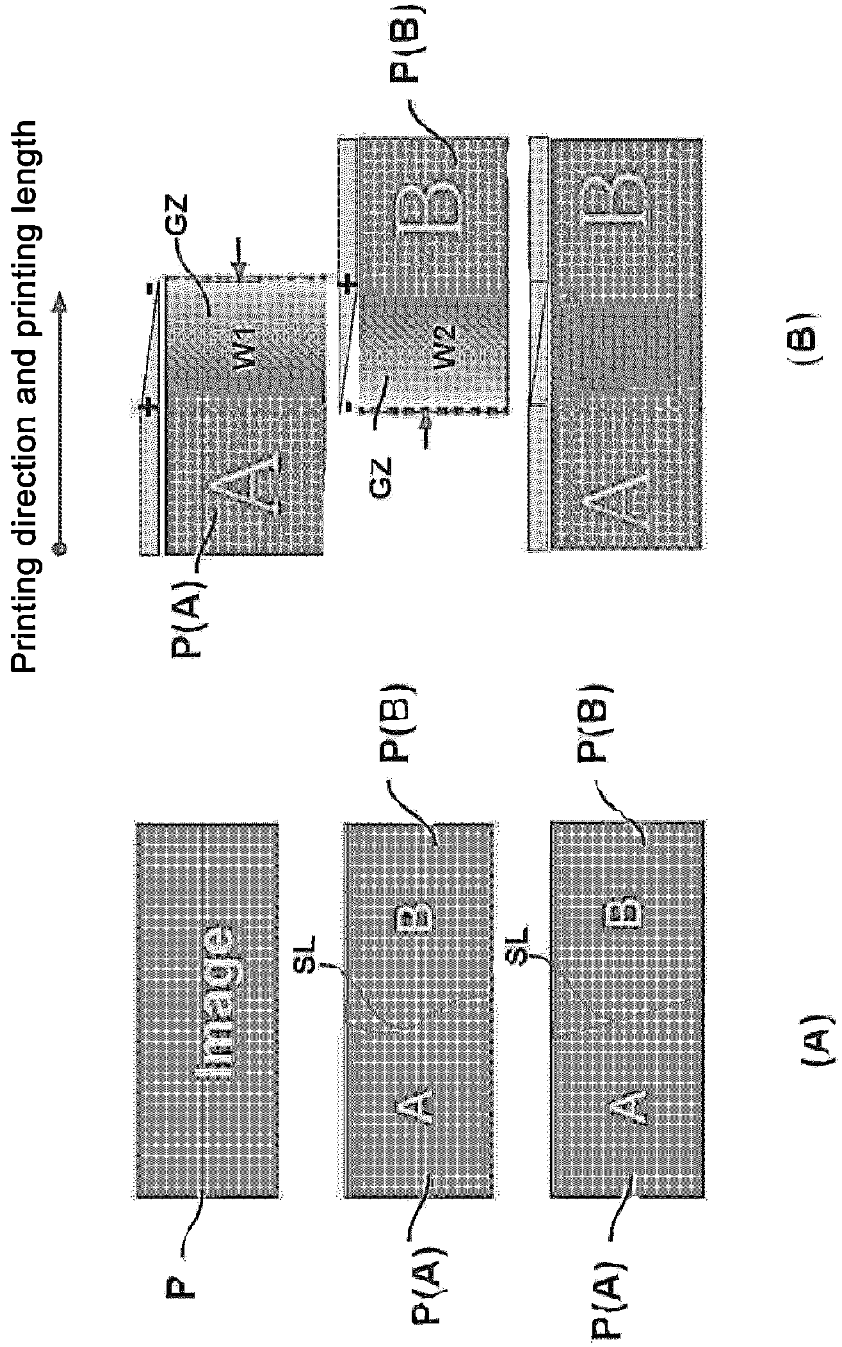

【FIG. 14】
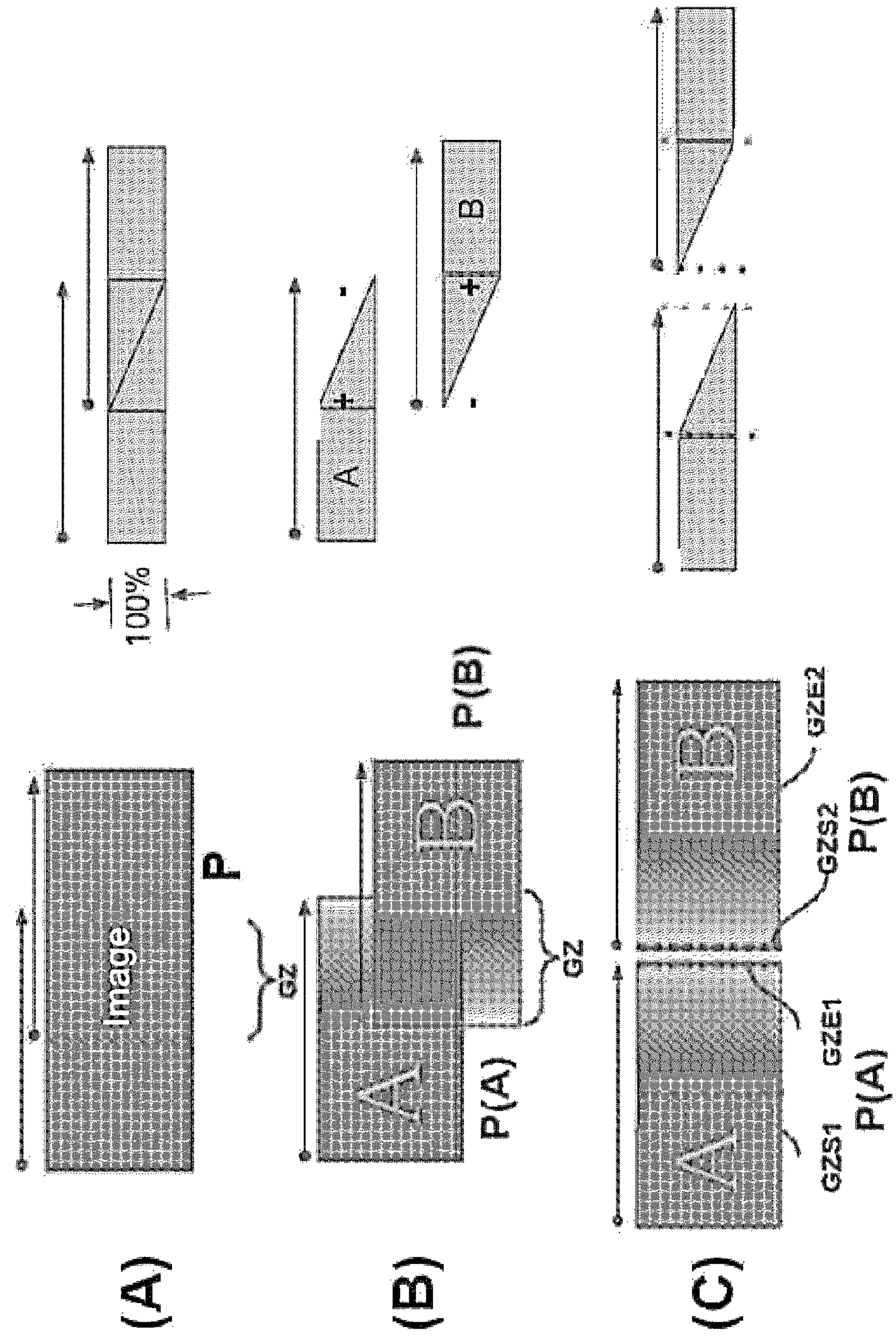

【FIG. 15】
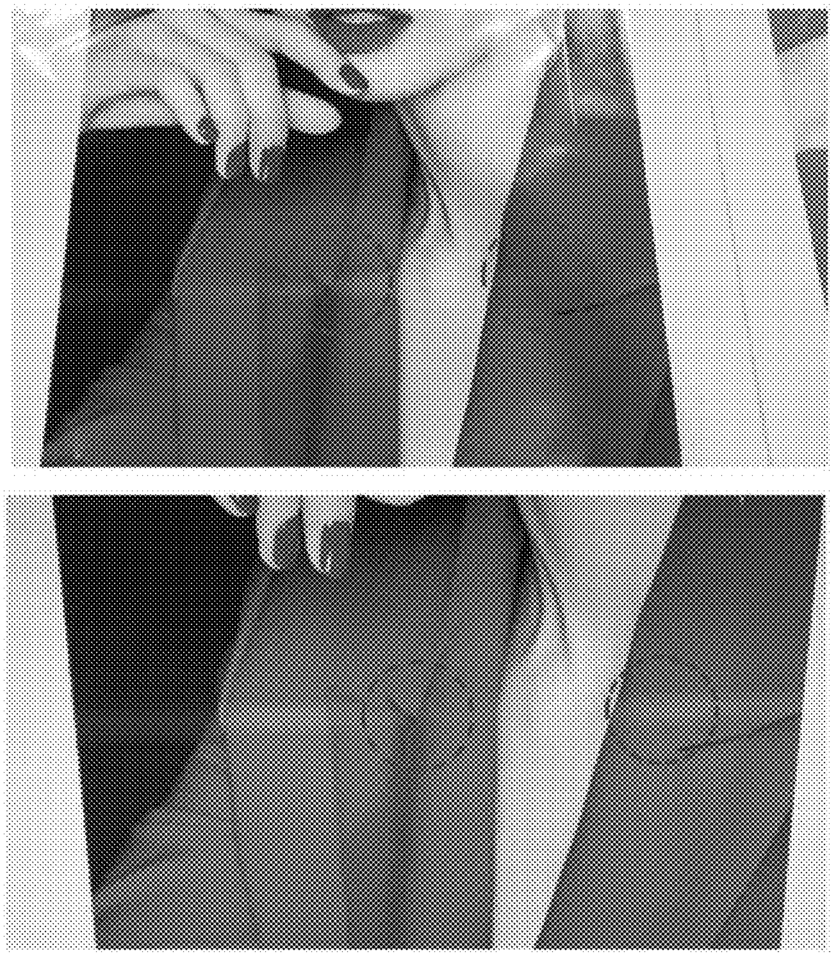
P1
P2

【FIG. 16】
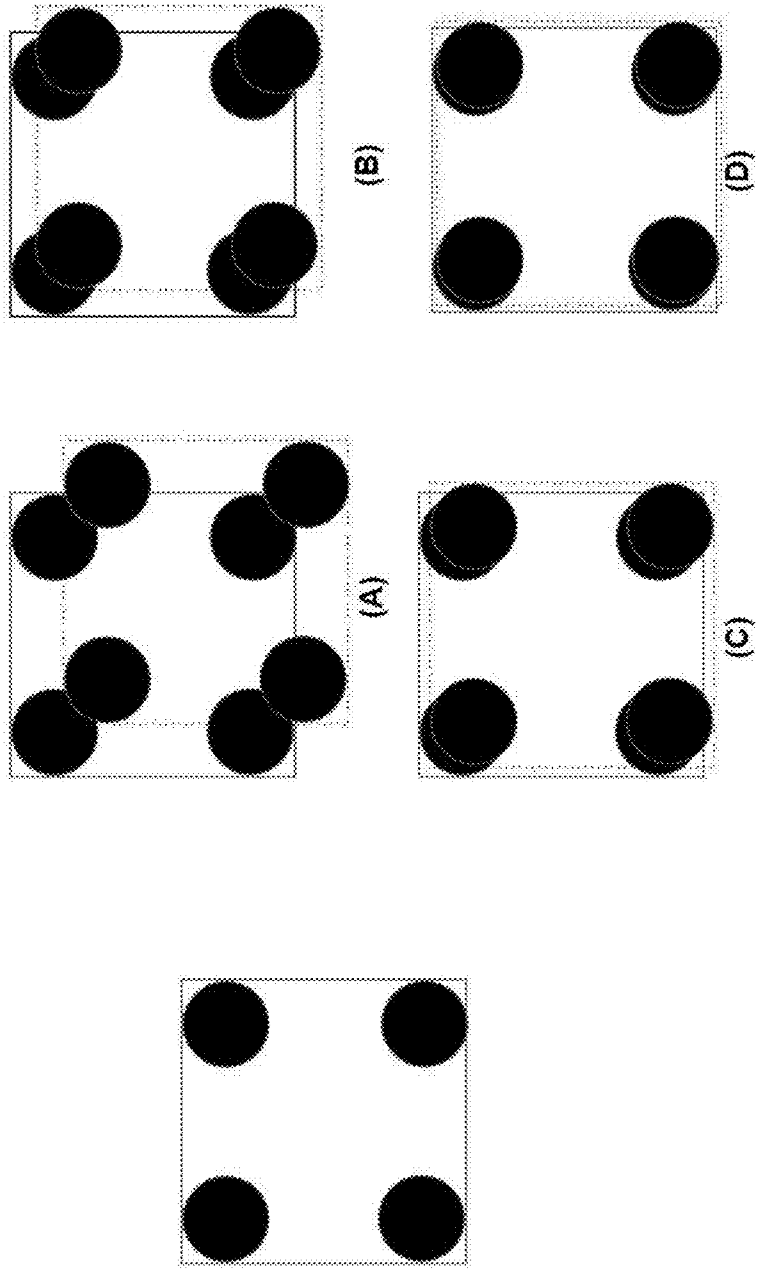

【FIG. 17】
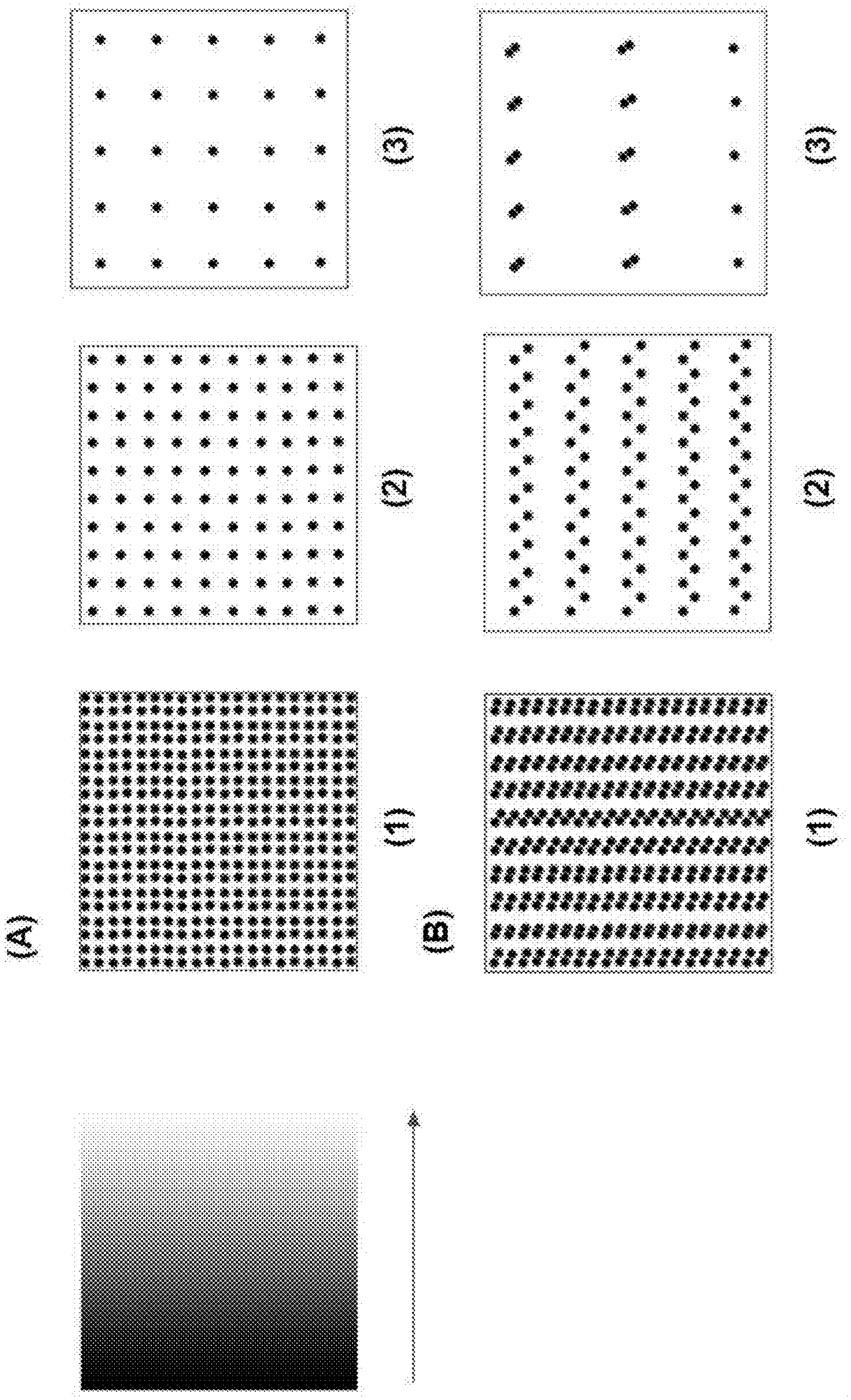

【FIG. 18】
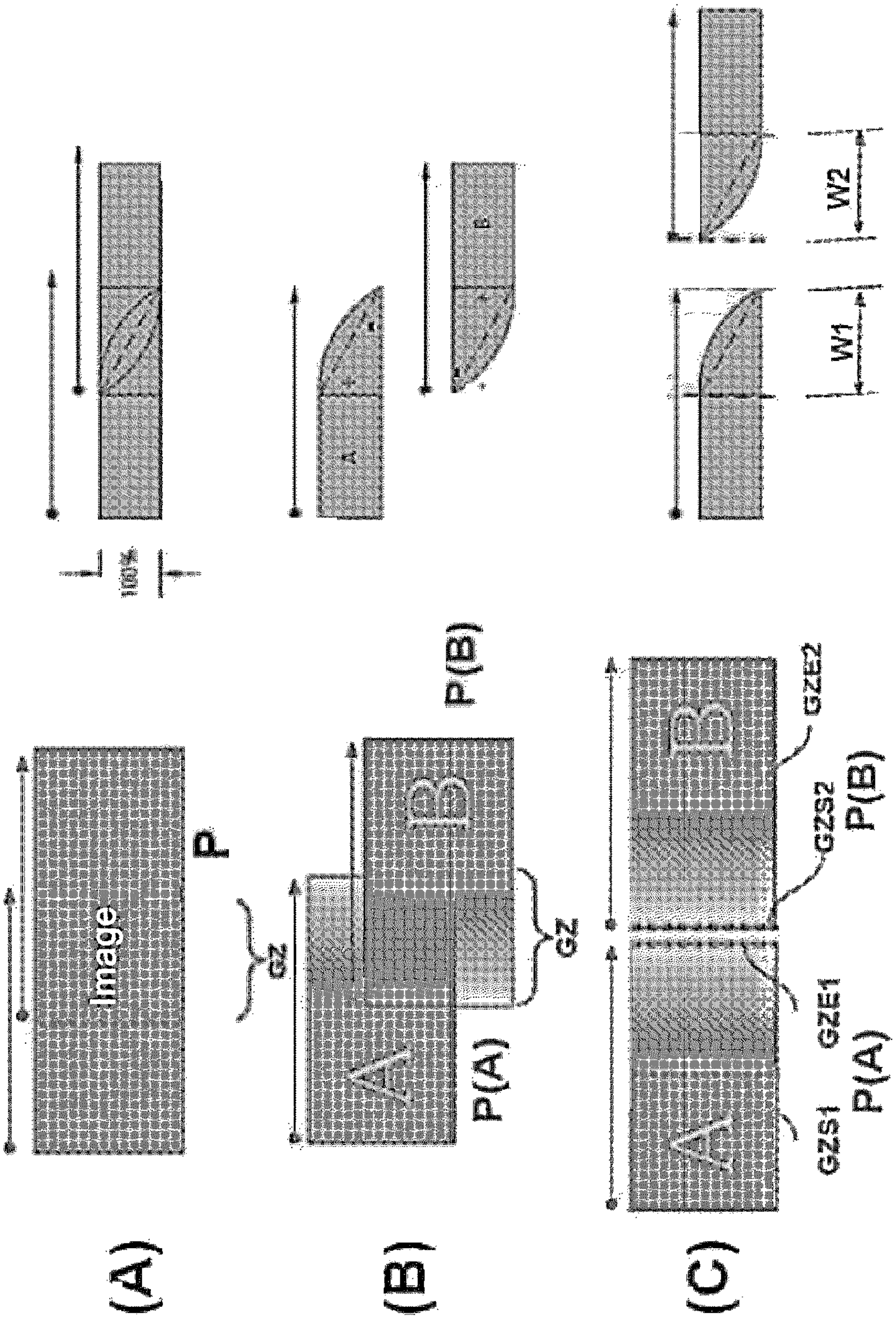

【FIG. 19】
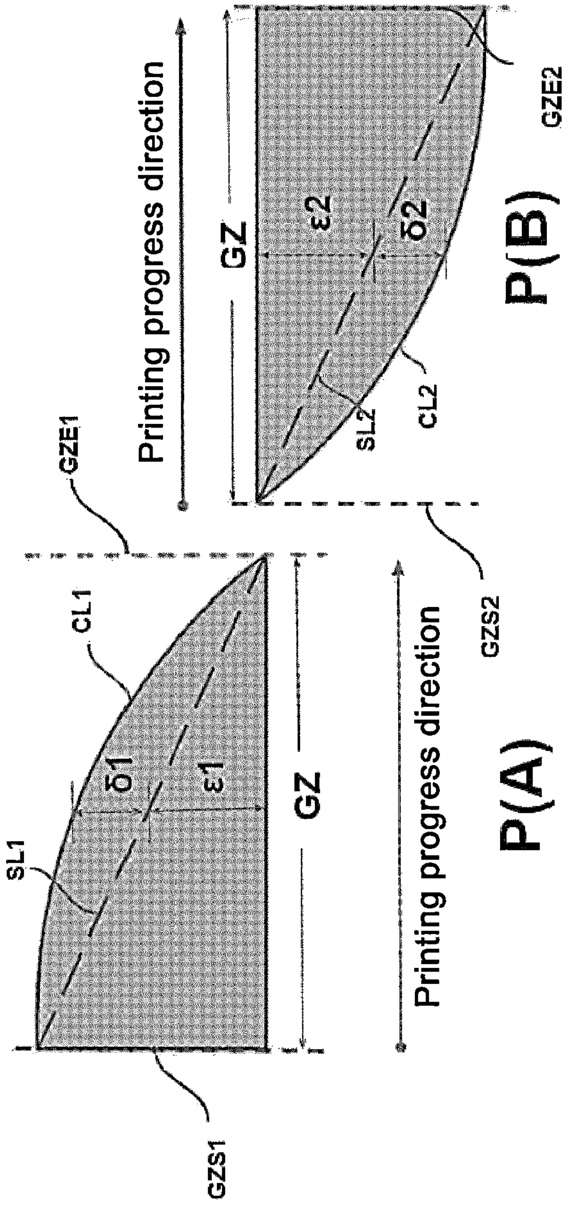

【FIG. 20】
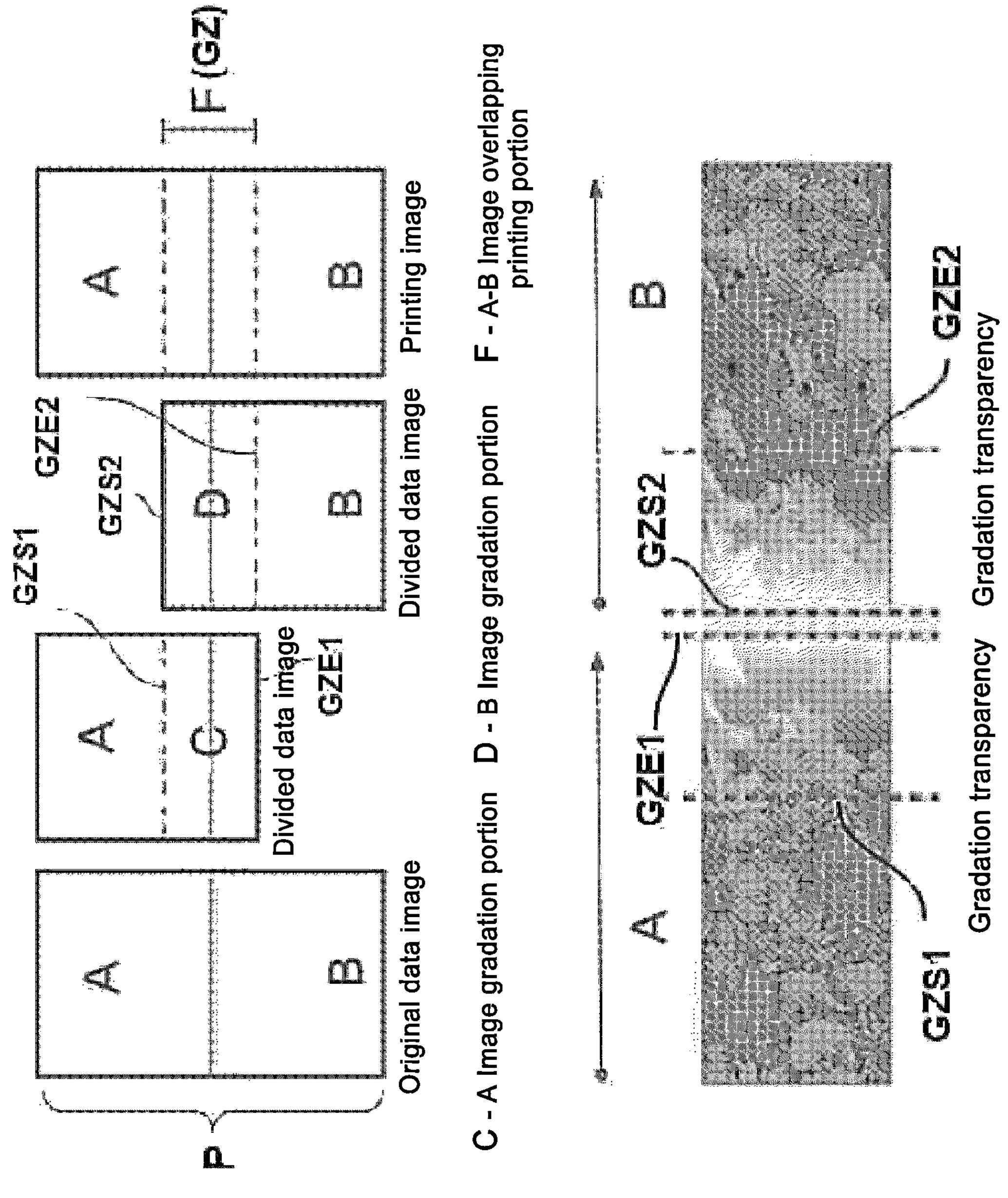

【FIG. 21】
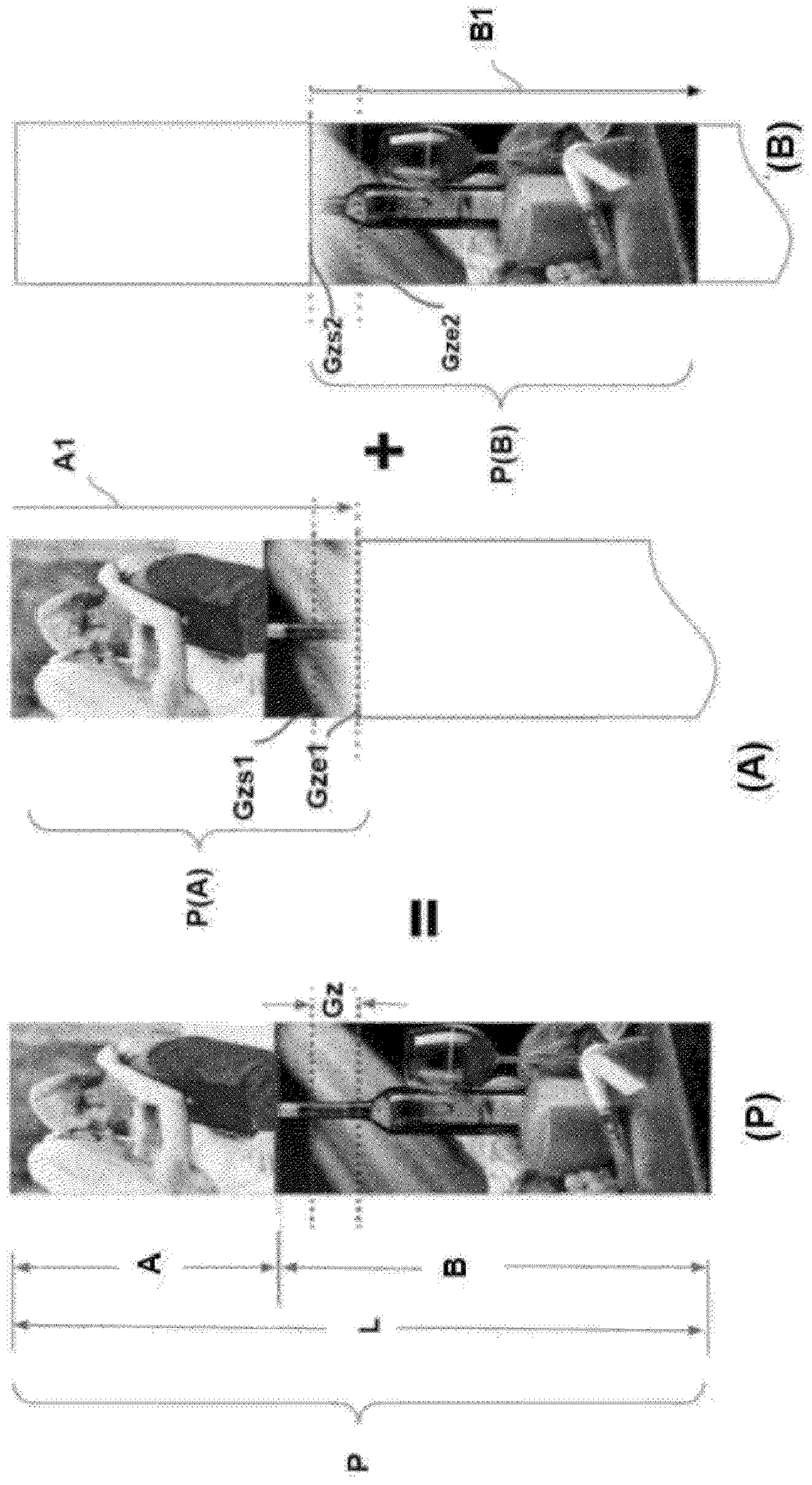

【FIG. 22】
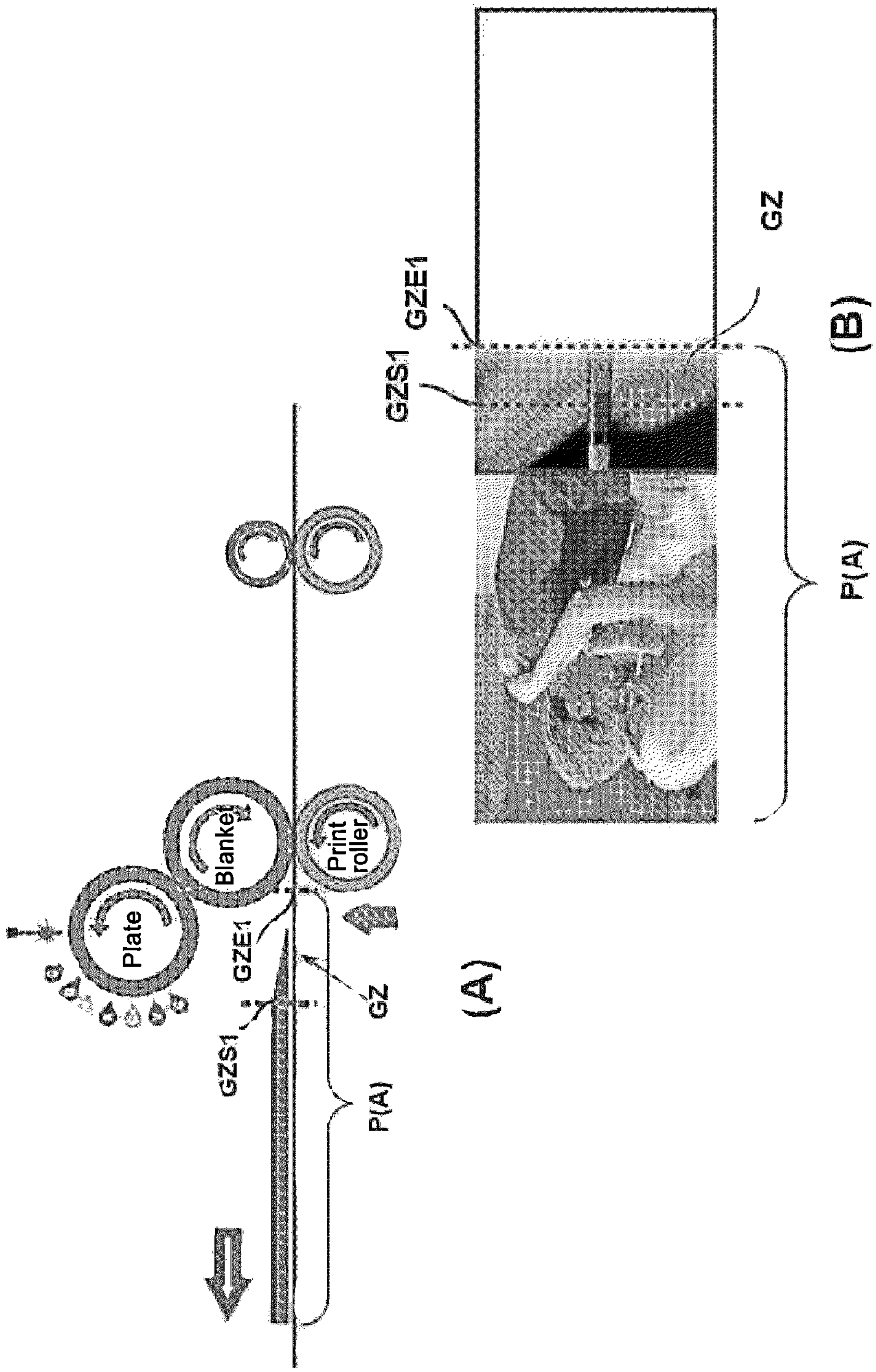

【FIG. 23】
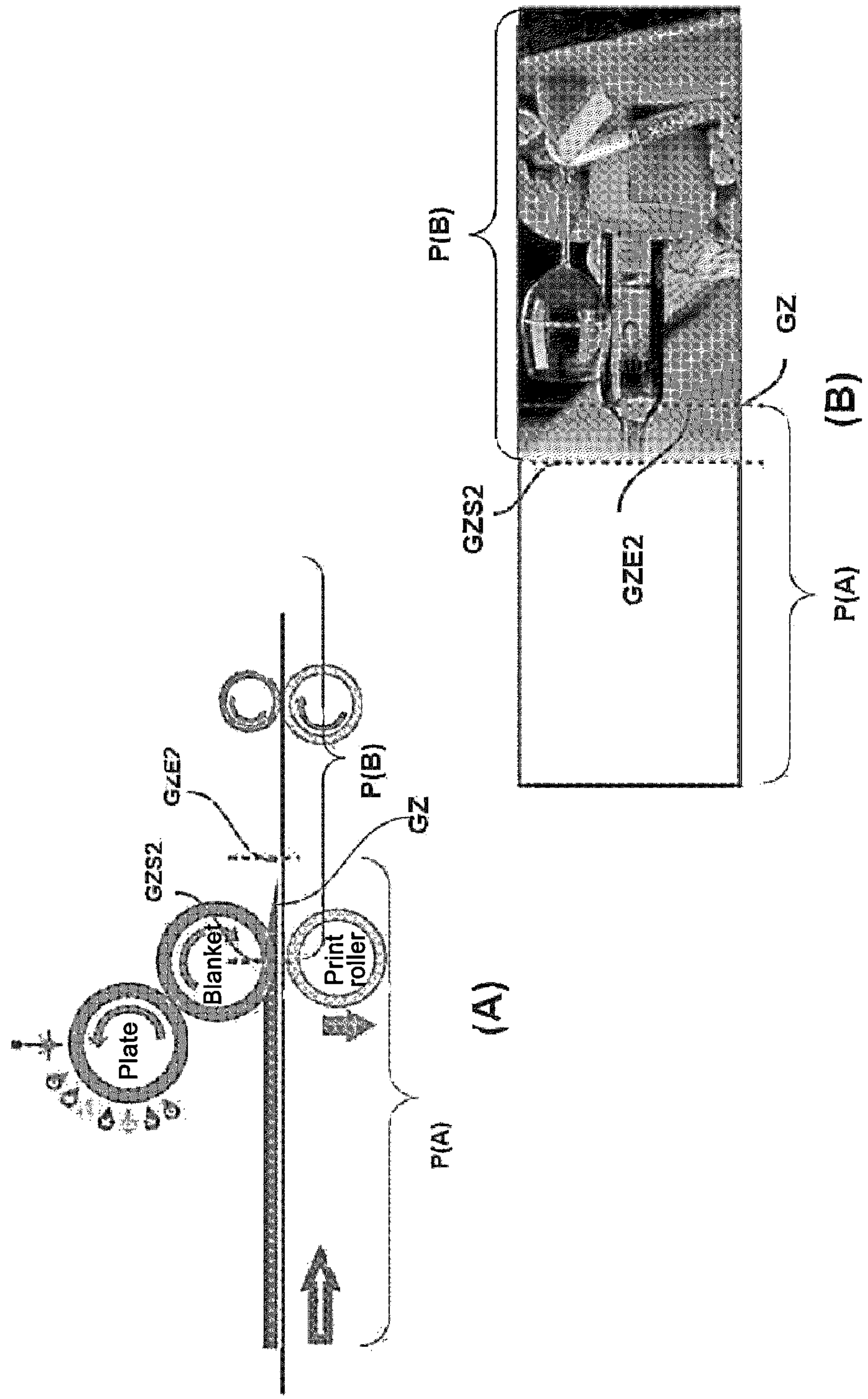

【FIG. 24】
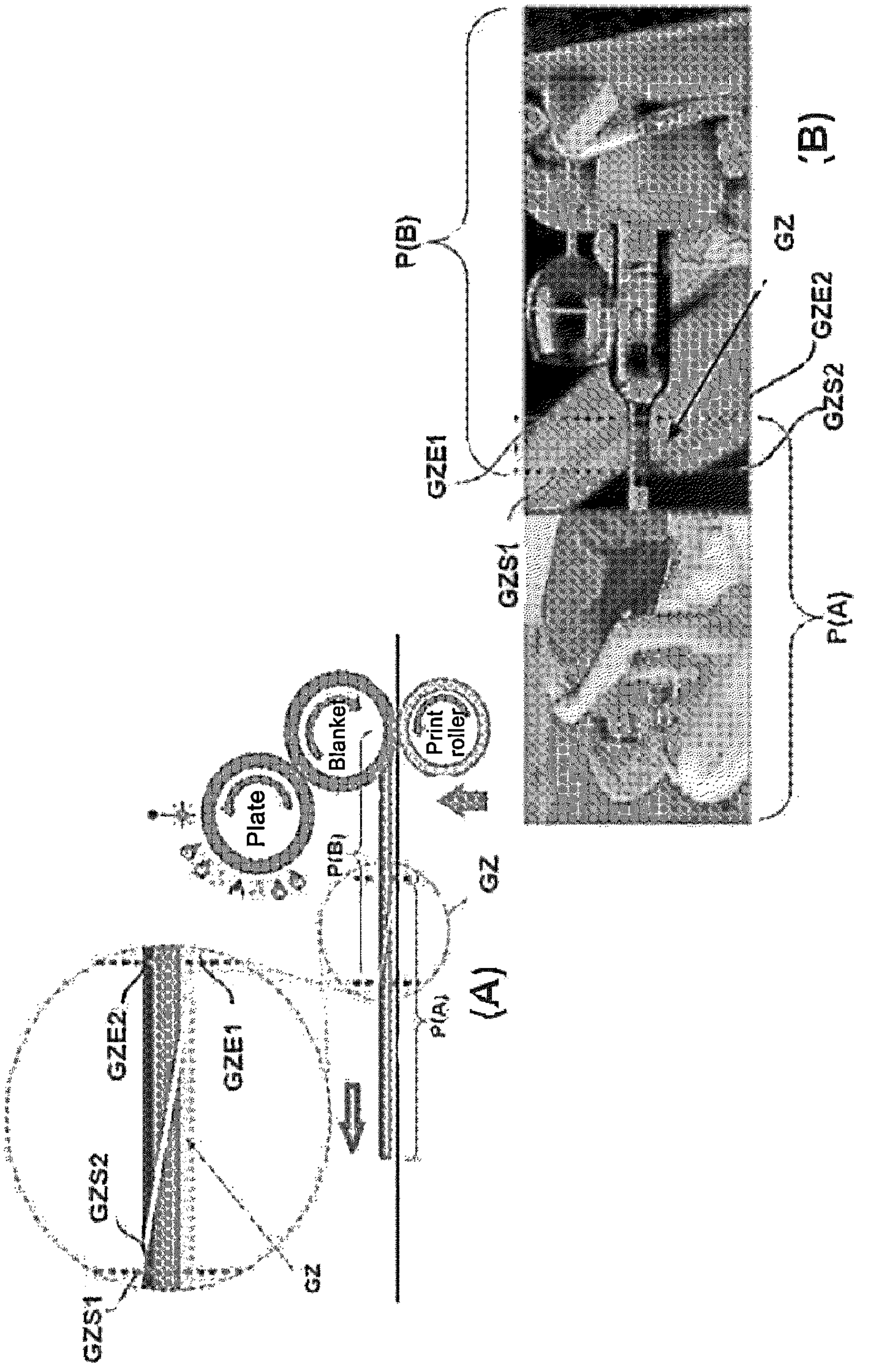

【FIG. 25】
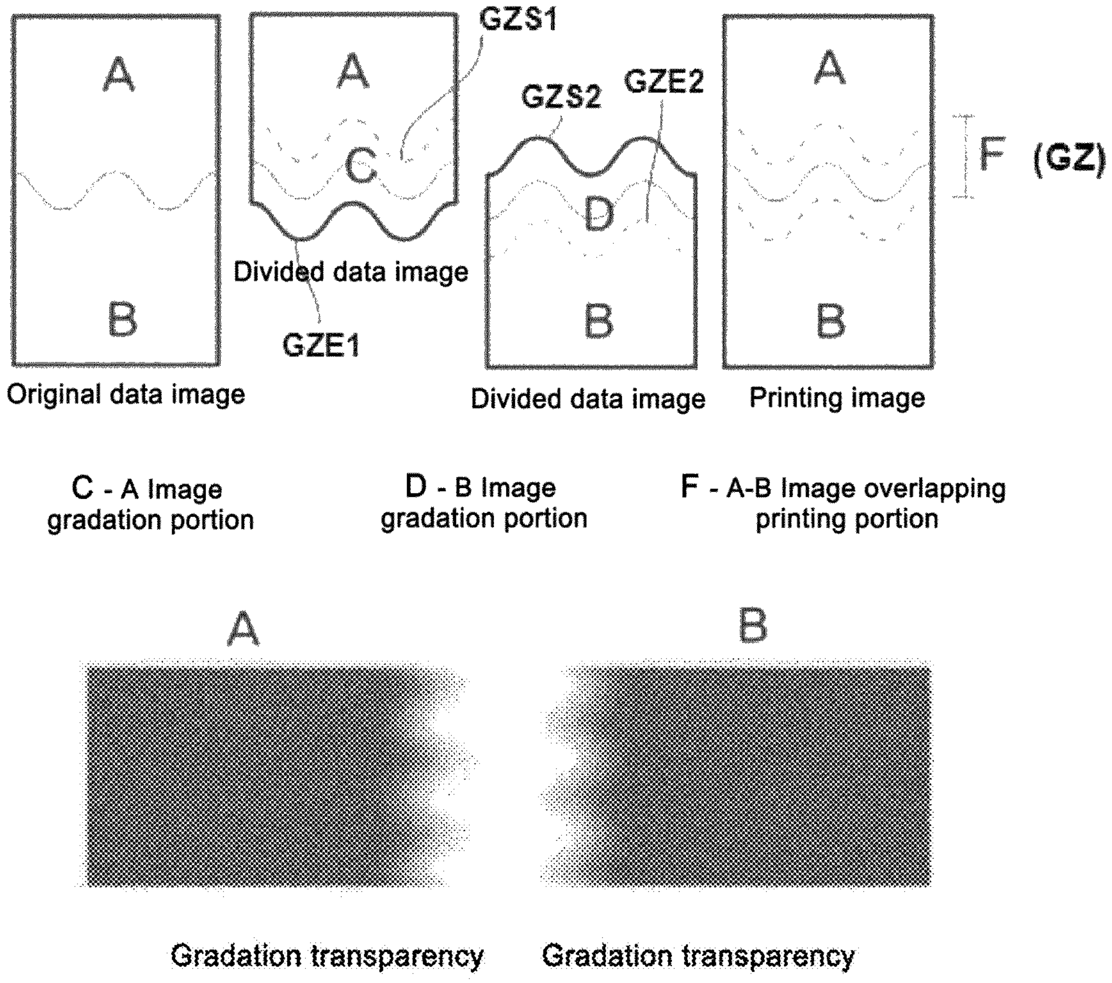

【FIG. 26】
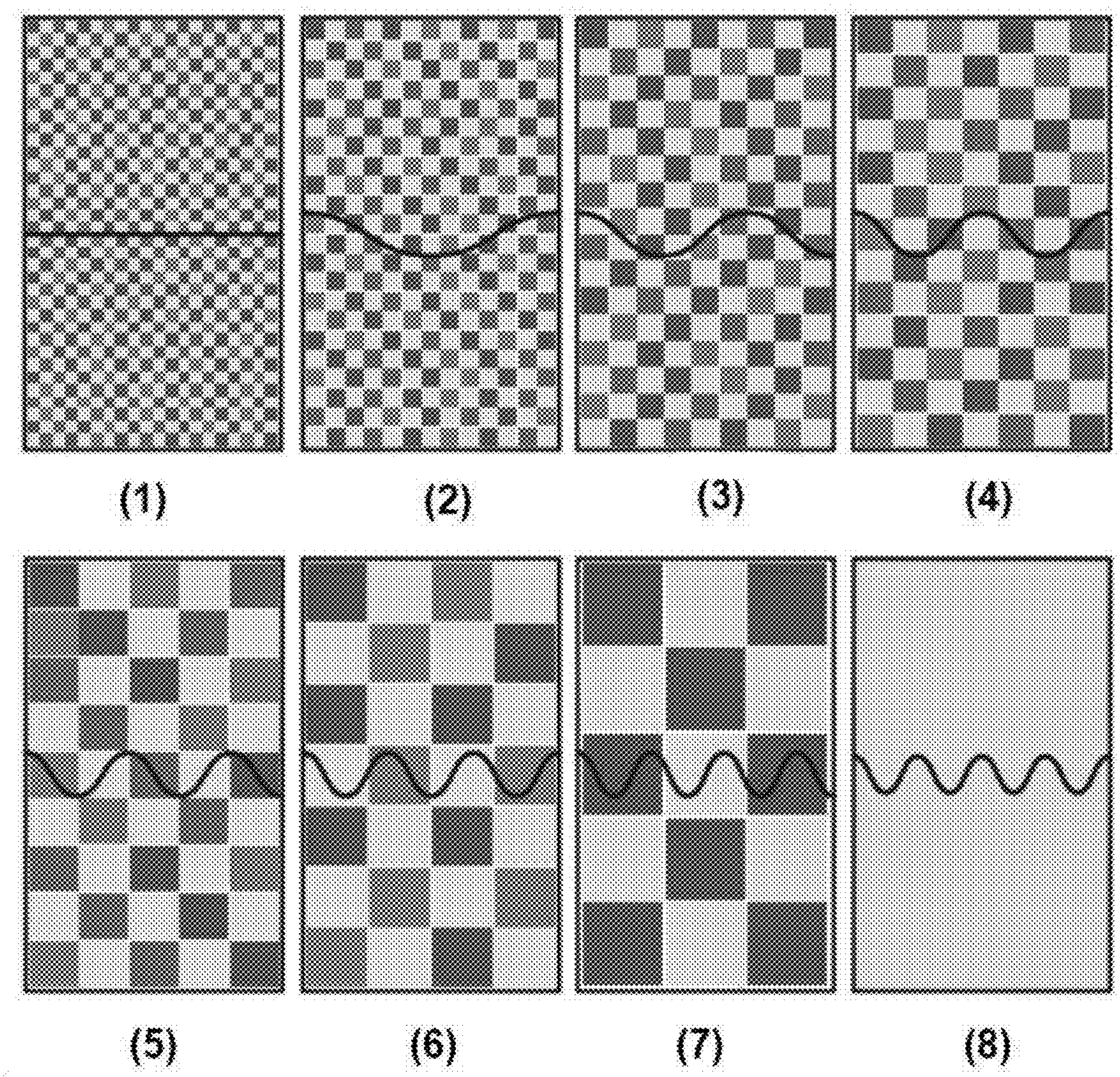

【FIG. 27】
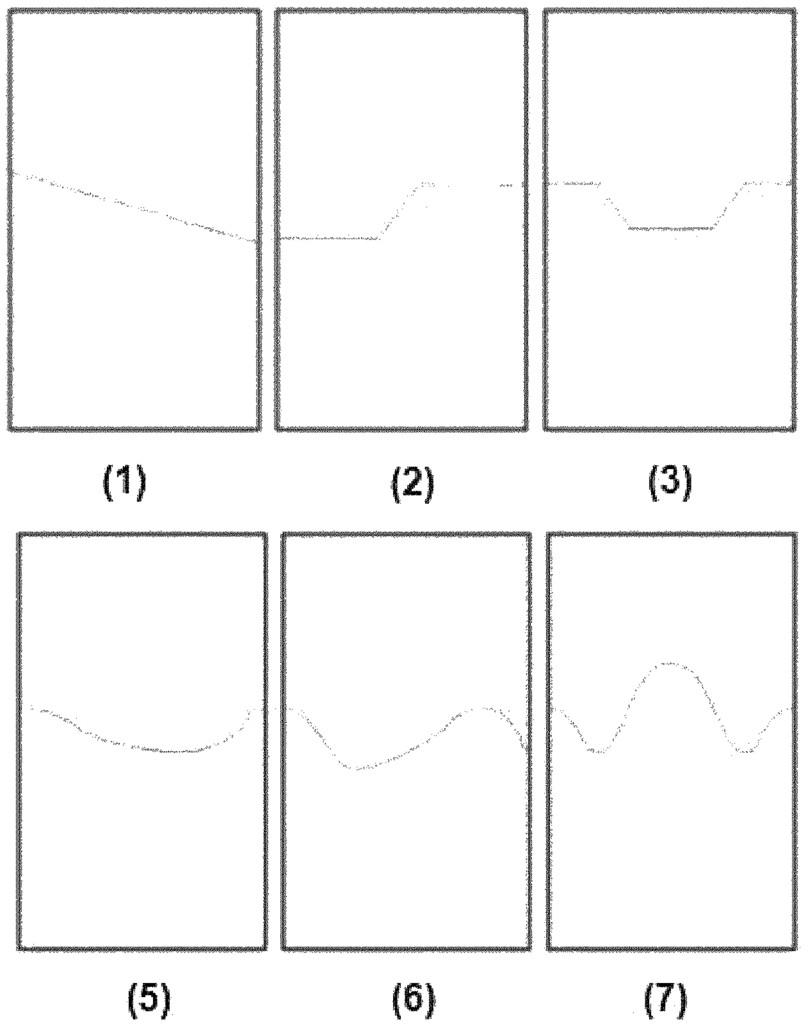

【FIG. 28】
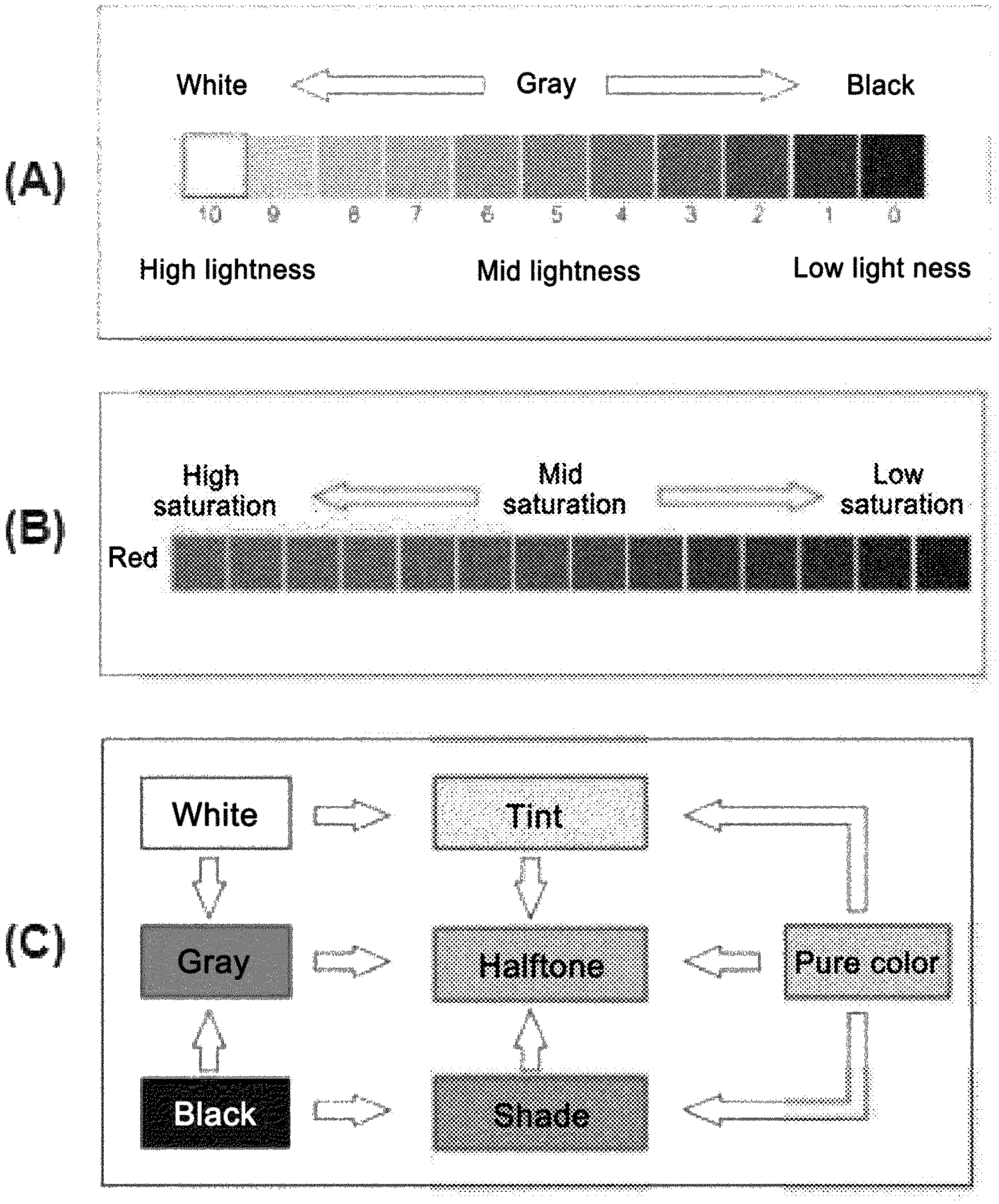
Tint and shade

【FIG. 29】
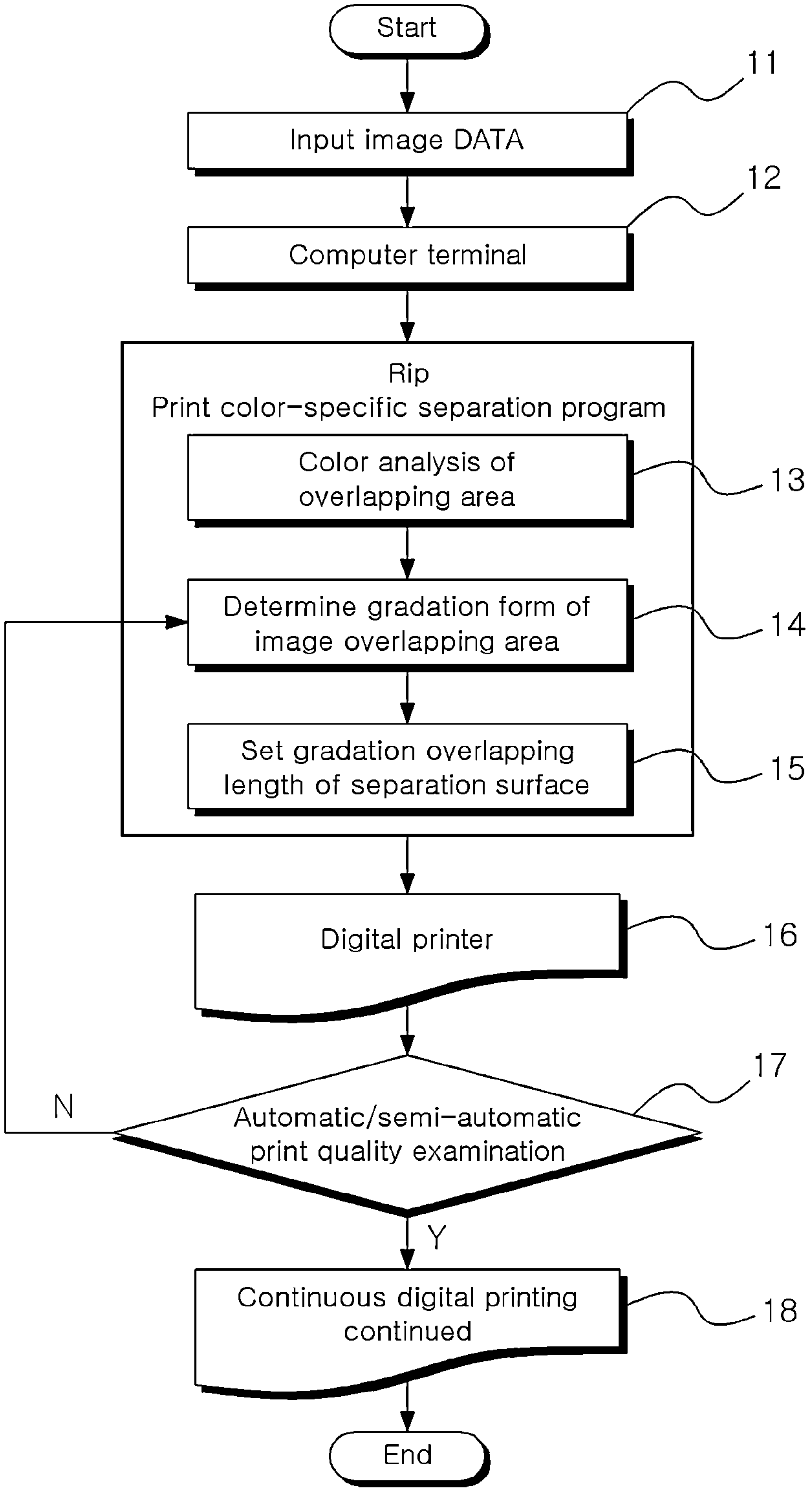

【FIG. 30】
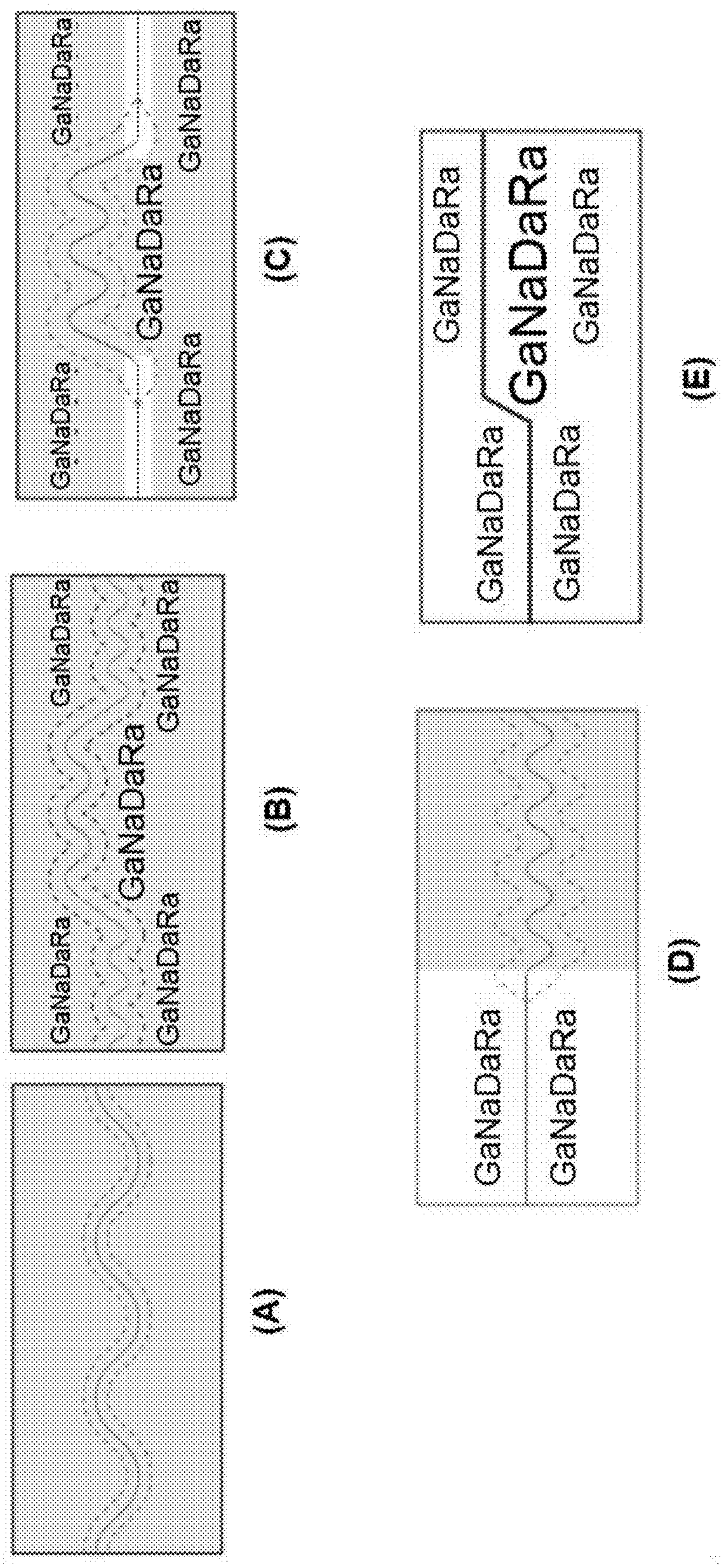

【FIG. 31】
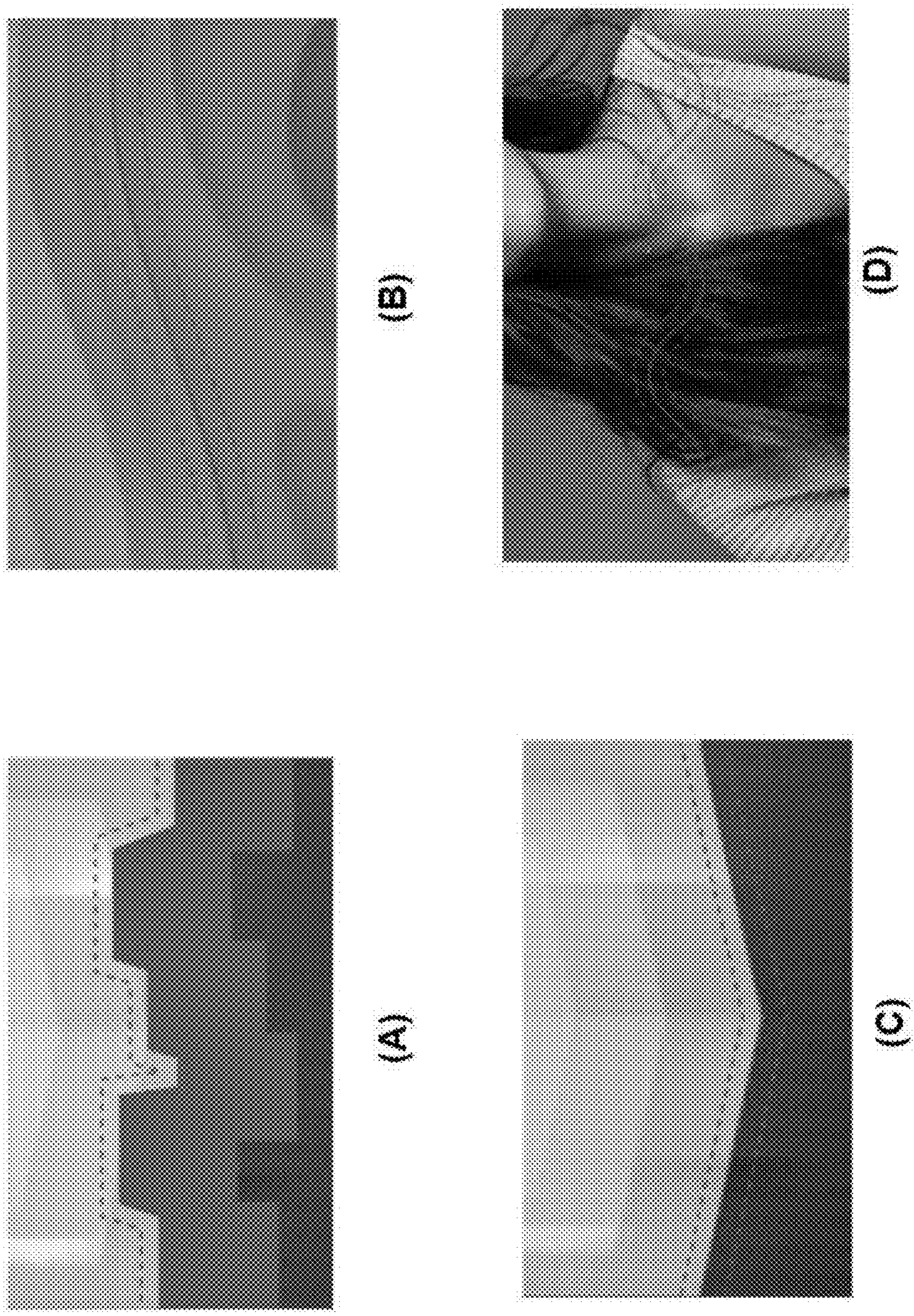
(A) (B) (C) (D)

【FIG. 32】
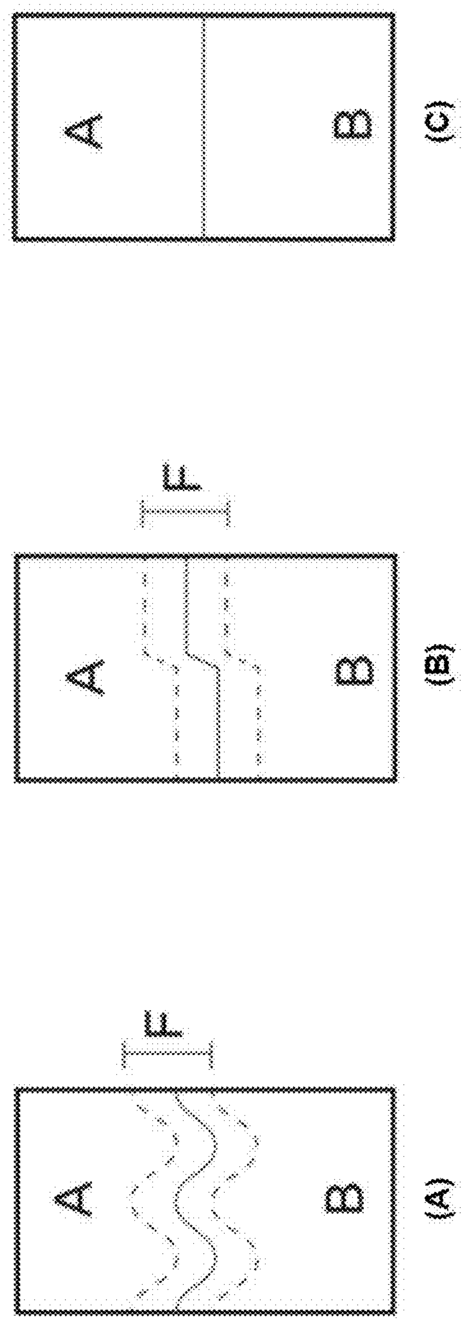

METHOD AND DEVICE FOR DIGITAL PRINT IMAGE-CONNECTING CONTINUOUS PRINTING FOR HIDING STITCHING LINE

TECHNICAL FIELD

The present invention relates to a device and a method for industrial digital printer printing using a roll-to-roll continuous in-line feeding method which treats an in-line primer coating on a fabric continuously un-wound from an un-winder roll and then prints an image on the surface thereof to obtain a printing fabric and continuously winds the printing fabric on a re-winder roll.

In particular, the present invention relates to a method and a device for digital print image-connecting continuous printing capable of greatly improving print quality, in which when the length of an in-line progress direction of a unit image to be obtained, which is printed on a fabric un-wound from an un-winder roll, is longer than the length of a photo imaging plate of a digital printer, the unit image is divided into a plurality of divided images and the plurality of divided images are operatively connected and printed so as not to see stitching lines that inevitably appear in connection portions thereof in the related art.

BACKGROUND ART

In general, a method of printing small images taken with a mobile phone or digital camera, such as portraits or images in everyday life such as landscapes taken during travel, on photo paper or predetermined printing paper is commonly printing images individually using a small personal or office printer. However, in the case of continuously and repeatedly outputting a large number of printed materials such as publications or continuously and repeatedly outputting super-large images having a very large unit image size to be output, such as signboards or advertisements, it is impossible to use home and office printers, and industrial printing methods such as offset printing, gravure printing, and digital printing need to be used.

The offset printing is a method of printing a computer to plate (CTP) plate obtained by outputting a printed plate with a computer by hanging on a printer, the gravure printing is a method of making the surface of a metal (copper plate) concave and putting ink in the concave portion to transfer the ink to the object to be printed, and the digital printing is a method of directly printing a printing image stored as a digital file on a computer-operated printing device without a physical printing medium such as a CTP or a copper plate.

The offset printing and the gravure printing have excellent print quality and are advantageous for mass printing such as publication. Digital printing technology is not inferior to offset printing or gravure printing in its printing quality to the extent to be called actual image output, and digital-based (e.g., mostly computer-generated) image files may be directly printed on the surface of media (fabric) of various materials and thicknesses (10 to 250 microns) such as paper, film (PVC, PET, etc.), aluminum, etc. It is very suitable for rapidly printing various types and very large sizes in small quantities of advertisements to meet the diverse needs of customers, like the surface of various small and medium-sized flexible packaging containers including vinyl pouches, shrink films, labels, in-mold labels or placards, banners, shoulder straps, signboards, Point of Purchase (POP: an image or phrase that guides product prices and features, promotional sales information, event information, etc. at marts, stores, event venues, etc., and product advertisements made at the time of purchasing goods or services) as well as traditional paper prints such as leaflets and posters.

Currently used digital printers are generally using a roll to roll printing method which rolls the printing fabric into a roll, on one side passes through a predetermined print engine unit while un-winding the printing fabric on a un-winder roller continuously in one direction, and thus repeatedly continuously outputting a predetermined unit length of printed content (image, etc.) along a length direction of the printing fabric and then continuously winding the printed fabric on the other side in a roll form. At this time, the supply roller and the re-winder roll are continuously unwound and wound in one direction without pause while the wound printing fabric is unwound and wound from one side to the other (in this case, the fabric is generally configured to pass through a predetermined roller set mechanism consisting of a plurality of direction changing rollers, tension adjusting rollers, drive rollers, transfer (supply) rollers, cooling rollers, etc.). The fabric is configured to locally and intermittently change its movement direction to forward and reverse directions by a movable mechanism of the print engine unit in a predetermined section of the process of passing the print engine unit.

The configuration of a conventional roll-to-roll supply type digital continuous printer of the printing fabric will be described in more detail as follows. As can be seen by FIG. 1 illustrating the central concept of digital printing (especially the core of the print engine unit), in order to obtain one original image, for example, nano ink particles of each color sprayed with a size of about 1 to 10 nanometers (nm) through each nozzle head 2 of an ink cartridge 1 of CMYK-OVG 7 colors are sequentially ejected in a predetermined order on a photo imaging plate 3, which is an electrostatic drum rotating counterclockwise several times at a predetermined speed to form a first original image, the first original image is transferred to an outer circumferential surface of a blanket 4 heated to a predetermined temperature that rotates clockwise in contact with an outer circumferential surface of the photo imaging plate 3 to form a thin-filmed second original image (printed original image) 5, and the printed original image 5 is transferred to the surface of a fabric 7 passing between the blanket 4 and a print roller 6 that rotates in ON/OFF contact with the outer circumferential surface of the blanket 4 according to a predetermined program to form a printing fabric 7A. In FIG. 1, reference numeral 8 is a laser exposure for determining A position of a printing reference point of a moving fabric, reference numeral 10 is a printing fabric roll on which the printing fabric is wound, and reference numeral 50 is a printing fabric 7A roll on which the printed fabric is wound.

In such a digital printer, an ink cartridge 1 ejecting fine nano-sized nano-ink droplets and an ink nozzle 2 connected with the ink cartridge 1 are fixed structures which are not changed in positions, but fixed to predetermined fixed positions, and nano ink droplets that are precisely ejected from the fixed structure in predetermined grid and direction are ejected precisely on the imaging plate 3 in program to obtain an original image.

In this way, a digital printer of roll-to-roll continuous feeding type of printed paper may print computer-generated digital images in good quality regardless of a material of an object (fabric) to be printed, and may also obtain an eco-friendly printed object by using water-based ink and a biodegradable fabric, and there is an advantage that high-speed output of about 25 to 35 meters per minute is possible. In addition, above all, in the process of continuous printing on the fabric, the print roller 6 rotating in contact with the blanket 4 moves in the reverse direction an operational ON/OFF connection configuration configured to alternately repeat connection and separation to the blanket 4 over time, and a predetermined divided non-printed section to be first performed while the print roller 6 is separated from the blanket 4 to connect and print subsequent divided images to the non-printing section. Accordingly, even in a large-sized image in which the longitudinal size of a unit print to be obtained is longer than the circumferential length R of the drum (plate), there is a great advantage of continuously printing the unit prints at high speed by connecting the unit prints.

However, there is a great advantage of being produced continuously by dividing and connecting such long large images through the nano-ink ejection type digital printer. However, in this case, since the stitching line, which is a connection outline, is inevitably exposed at a connection position on an end side of the preceding image where a start end of the subsequent divided image is connected to the preceding divided image, there is a problem that the print quality of the completed print is deteriorated. Even if a sophisticated laser exposure 8 is used to determine a printing reference point position on the fabric, there is a limit to adjusting a nanometer-level pixel focus with such a mechanical positioning structure.

FIGS. 2 and 3 are actual photographs of printing a large print P in which a length L of a unit image is greater than an outer circumferential length R (illustrated in FIG. 1) of a drum of a digital printer (L>R) using a conventional digital printer described above. FIGS. 2 and 3 are photographs of actual digital print cases capable of confirming that when the large unit image is divided into two upper and lower small images A and B (A<R, B<R) and the small images are connected and printed, due to the presence of a stitching line SL occurring at the connection portion of the divided images, the print quality of the final print is deteriorated.

Such a stitching line is an inevitable phenomenon because there is a limit to increasing the printing precision of the connection portion by a mechanical method when connecting the images by changing the forward and reverse rotational directions of the print roller 6 in the connection section to feed-back the fabric, in order to connect and print long divided images even if the connection portion of the two divided images A and B (a portion connecting the end of the previous image and the start of the subsequent image) is precisely aligned to a connection point.

Accordingly, when a large unit print P in which a length L of a unit image is larger than a circumference length R of a drum of a digital printer (L>R) is divided into two short images A and B (A<R, B<R) and the images A and B are operatively connected and printed using a conventional digital printer, there is a demand for an image-connecting continuous printing method of a new digital printer to make a linear stitching line SL appearing at the connection portion of these divided images invisible, and the present invention meets the need.

Meanwhile, as conventional digital cameras, or especially smart phones equipped with digital cameras, are widely spread, it is possible to take pictures usually regardless of time and place, the captured photo images are stored in a digital storage medium or cloud server, and stored photo images may be easily printed whenever necessary by connecting a terminal (digital camera, smart phone, USB memory stick, laptop, etc.) that may transfer the images to a printer. In addition, it is possible to obtain a panoramic image by connecting these small images in everyday life vertically and/or horizontally through various photo processing software (applications) installed in a smart phone. These panoramic images may be output on a separate sheet for each image and properly pasted to obtain a panoramic photo, or integrated and output into one image in advance using a function provided by a photo processing application, combine them into one image before outputting a plurality of images. In relation to this technology, there is Korean Patent Publication No. 10-2014-0047446 filed by Prinics Co., Ltd., which is worth mentioning in relation to a technology that may output (print) the panoramic images so as not to expose the stitching line at the connection portion of the panoramic images.

That is, Korean Laid-open Patent Publication No. 10-2014-0047446 is a technology related to a panoramic image output (print) system. For example, there is disclosed a panoramic image printing technology of separating a panoramic image consisting of a plurality of images attached long laterally into predetermined sizes according to a printable size of a movable ink ribbon built in the printer, and setting length information of a boundary so that partial portions of the separated panoramic images overlap with each other, while providing a terminal that determines and outputs the print density according to a length of the overlapping boundary to receive length information of the boundary overlapping with the panoramic image separated from the terminal and a differential print density according to the length of the boundary, and sequentially print with different densities according to the length information of the overlapping boundary and the differential print density.

However, Korean Laid-open Patent Publication No. 10-2014-0047446 technology has a basic technical idea that the heating time of a thermal transfer head needs to be constantly controlled in order to keep the print density of the image constant, and in a different viewpoint, a technology that uses a technical effect of implementing thinly the density of the transferred image (lower the print density) by changing (shortening) the heating time of the thermal transfer head. In more detail, the technical principle of Korean Laid-open Patent Publication No. 10-2014-0047446 is illustrated in FIGS. 4 and 5 as the accompanying drawings of the present invention. When lengths A and B of boundaries 1 and 2 (301 and 311) are set as illustrated in FIG. 4A, print densities are set in inverse proportion to each other according to overlapping positions of the boundaries 301 and 311 after overlapping the boundary 1 301 of panoramic image 1 and the boundary 2 302 of panoramic image 2. As illustrated in FIG. 5A, in order to decrease the print density toward one side of the boundary (as progressing to the right on the drawing), as illustrated in FIG. 5B, a high-density area (non-overlapping area) of the image maintains a long head heating time TO, and when reaching the boundary to lower the density of the image, a panoramic picture 400 is printed on paper by controlling the heating time of the thermal transfer head to be gradually shorter as T1>T2>T3 along the progress direction of the printing ribbon. Since the technical configuration of controlling the heating time of the thermal transfer head is an essential part of Korean Laid-open Patent Publication No. 10-2014-0047446, in more detail, a technical principle that the printing density of the transferred image may be reduced by reducing the heating amount on the ink ribbon of the thermal transfer head is used. However, when configuring the heating part of the actual thermal transfer head, it is not actively seeking a heating amount variable means in the thermal transfer head so as to directly vary the heating amount, but the heat amount relatively transmitted to the ink ribbon is controlled by controlling the moving speed of the ink ribbon and the printing paper moving in contact with the thermal transfer head. In this case, a technical configuration for differentially and variably controlling a driving speed (moving speed) of the ink ribbon and the printing paper is required. However, in this technology, it is not explicitly or implicitly mentioned what a technical configuration for variably controlling the moving speed of the ink ribbon and the printing paper is and how the technical configuration may be configured. In addition, in Korean Laid-open Patent Publication No. 10-2014-0047446, in order to sequentially print the overlapping area set to an inversely proportional print density, inevitably, the overlapping area section needs to be printed by feedback (reverse direction), but there is not mentioned at all a technical configuration for enabling the feedback (reverse progress) of the overlapping area section, in particular, how to solve a print image positioning method and a problem of image point misalignment in the overlapping area.

For example, the technology of Korean Laid-open Patent Publication No. 10-2014-0047446 is just useful for non-commercial personal or home image printing that slowly prints everyday photos, such as images taken with a mobile phone, regardless of a single number or a relatively small number of times, but is different in a basic technical configuration and an industrial application field from an industrial digital printer for repeatedly printing a super-large image having a unit image length of, for example, about 2 meters, into hundreds or thousands of images at a high-speed output of about 25 to 35 meters per minute, like the present application. Accordingly, in reading Korean Laid-open Patent Publication No. 10-2014-0047446 as the related art, superficially at first glance, only the technical configuration of 'inversely proportional gradation printing of the overlapping area' may be considered as the same or similar technical idea as the present invention, but specifically, the implementation method and the printing method of the basic print engine core are completely different technologies from the present invention.

DISCLOSURE

Technical Problem

From the recognition of the problems of the conventional digital print as described above, an object of the present invention is to provide a new printing method capable of preventing stitching lines of connection portions in large image-connecting continuous printing using a digital printer that ejects fine nano-ink particles fixedly from each fixed nozzle head of an ink cartridge fixed at a predetermined position to obtain a printing original image and then transfers the printing original image to a printing fabric.

Technical Solution

According to an embodiment of the present invention, there is provided a device for digital print image-connecting continuous printing including: an un-winder roll for unwinding a printing fabric; a re-winder roll for winding the printing fabric on which printing has been completed; a printing engine provided between the un-winder roll and the re-winder roll and including a blanket rotating while being in contact with a photo imaging plate and a print roller rotating while being in contact with the blanket; and a fabric direction switching mechanism for switching a transfer direction of the printing fabric passing between the blanket and the print roller into a forward direction or a reverse direction, in which the printing engine prints a first divided image including a first overlapping area on a first fabric of the printing fabric when the transfer direction is the forward direction, locates only the first overlapping area printed on the first fabric under a second fabric of the printing fabric when the transfer direction is the reverse direction, and prints a second divided image including a second overlapping area on the second fabric to generate a unit image in which the first overlapping area and the second overlapping area overlap each other when the transfer direction is the forward direction.

According to another embodiment of the present invention, there is provided a method for digital print image-connecting continuous printing including un-winding, by an un-winder roll, a printing fabric; printing, by a printing engine, the printing fabric; switching, by a fabric direction switching mechanism, a transfer direction of the printing fabric passing between the blanket and the print roller of the printing engine into a forward direction or a reverse direction; and winding, by a re-winder roll, the printing fabric on which printing has been completed, in which the printing of the printing fabric includes printing a first divided image including a first overlapping area on a first fabric of the printing fabric when the transfer direction is the forward direction; locating only the first overlapping area printed on the first fabric under a second fabric of the printing fabric when the transfer direction is the reverse direction; and printing a second divided image including a second overlapping area on the second fabric to generate a unit image in which the first overlapping area and the second overlapping area overlap each other when the transfer direction is the forward direction.

Advantageous Effects

The method and the device for digital print image-connecting continuous printing according to the present invention made by the above-mentioned object and the above-mentioned technical configuration to solve the object is particularly useful when printing a large image P with high quality, where the length L of the unit image to be printed is greater than the outer circumferential length R of the drum of the digital printer (L>R).

More particularly, in a large-scale industrial digital printer that obtains an original image to be printed by ejecting fine ink particles of 1 to 10 nanometers in size from each nozzle head 2 of an ink cartridge, in operatively connecting and printing two divided images (A<R and B<R) divided into two small images (A and B) when printing a large image with a unit image length of about 2 meters, the method and the device for digital print image-connecting continuous printing according to the present invention may dramatically improve the print quality of conventional digital printers so as not to expose linear stitching lines SL in the connection portions in the related art by a complementary and supplementary printing density gradation printing technique in the overlapping area of these two divided images.

DESCRIPTION OF DRAWINGS

FIG. 1 is a diagram illustrating a central concept of digital printing.

FIGS. 2 and 3 are photographs of an actual digital printing case capable of determining that clear linear stitching lines SL are shown at these connection portions when connecting two divided images A and B divided when outputting a large print P in which a length L of a unit image is greater than an outer circumferential length R of a drum of a digital printer (L>R) using a conventional digital printer.

FIG. 4 is a technique disclosed in Korean Patent Publication No. 10-2014-0047446, wherein (A) of FIG. 4 is an exemplary diagram illustrating a process of setting a length of a boundary of a panoramic image, and (B) of FIG. 4 is an exemplary diagram illustrating the density of an image according to the length of the boundary of the panoramic image.

FIG. 5 is a technique disclosed in Korean Patent Publication No. 10-2014-0047446, wherein (A) of FIG. 5 is a gradation exemplary diagram for illustrating variable printing of a printing density according to a length of a panoramic image boundary, and (B) of FIG. 5 is an exemplary diagram illustrating a procedure idea capable of gradually reducing a printing density by gradually shortening a heating time of a thermal transfer head for a printing ribbon along a printing progress direction as the printing progresses.

FIG. 6 is a diagram schematically illustrating an overall configuration of a digital printer, and a diagram illustrating a state in which a printing engine core unit of the digital printer is enlarged and illustrated in a circular dotted line, and a pair of upper and lower horizontal reciprocating transfer rollers, which are one of components of a fabric direction switching mechanism, are moved to a position to start printing.

FIG. 7 is a diagram illustrating a state in which printing of a first divided image A starts when the horizontal reciprocating transfer rollers start to be transferred to the right.

FIG. 8 is a diagram illustrating a state in which the printing is further progressed in FIG. 7.

FIG. 9 is a diagram illustrating a state in which the printing is further progressed in FIG. 8.

FIG. 10 is a diagram illustrating a state in which printing is further progressed in FIG. 9, and a diagram illustrating a step of further progressing the printing continuously in a non-printed state by a length of a second divided image B by moving the fabric backward after the first divided image A is printed.

FIG. 11 is a diagram illustrating a process in which the horizontal reciprocating transfer rollers start to be transferred again in a left direction after the step of FIG. 10, which is a diagram illustrating that the fabric moves in a reverse direction and a print roller is spaced apart from a blanket at an interval.

FIG. 12 is a diagram illustrating a state in which the horizontal reciprocating transfer rollers are transferred to the leftmost side followed by FIG. 11, which is a diagram illustrating that the fabric moves in a reverse direction and the print roller is spaced apart from the blanket at an interval.

FIG. 13 is a diagram (B of FIG. 13) illustrating a basic technical idea in which a predetermined portion GZ of the divided image is configured as an overlapping connection portion to prevent stitching lines from occurring due to a gradation printing principle of the overlapping connection portion, compared to the fact that a predetermined stitching line is exposed at the connection portion of the divided image according to a conventional digital printing technique (A of FIG. 13).

FIG. 14 is a diagram illustrating a gradation distribution of each printing density in the overlapping connection portion of (B) of FIG. 13 and a description principle of a gradation configuration in more detail along the printing progress direction of each divided image.

FIG. 15 is photographs of an actual digital print case showing that according to the technical idea disclosed in (B) of FIG. 13 and FIG. 14, the print density along a print length direction in the overlapping connection portion of the divided images is divided into a decreasing density portion of a linear (linear function formula) change rate and an increasing density portion of a linear (linear function formula) change rate to always complementarily configure an arithmetic sum of a decreasing density value and an increasing density value as 100% at any position in a connection portion of the divided image, and as a result, even though the linear stitching lines are not shown, an actual printed result shows that a color density decreasing portion is formed at the connection portion.

FIG. 16 is a schematic diagram for describing a reason why when overlapping and printing twice with a time interval, even if the number of print ink droplets is equally doubled, the printed density cannot be doubled.

FIG. 17 is another exemplary diagram for understanding a correlation between the number of printing ink droplets and an attachment position of the ink droplets, in which (A) of FIG. 17 is a diagram illustrating a distribution of printing ink droplets assuming an ideal case in which nano-sized printing ink droplets are ejected and attached to the printing fabric and then evenly distributed in n empty area of the printing fabric, and (B) of FIG. 17 is a schematic diagram illustrating that the distribution of nano printing ink droplets is random during actual printing.

FIG. 18 is a schematic diagram of giving a variable weight of a gradation density of the overlapping connection portion of divided images according to the present invention illustrating printing by giving a variable weight of a gradation density according to a printing progress direction of the overlapping connection portion of the divided images in order to improve a problem of the color density lowering portion illustrated in FIG. 15.

FIG. 19 is a diagram illustrating a variable weight concept of each gradation density in detail according to the printing progress direction in the overlapping connection portion of the divided image according to the present invention illustrated in FIG. 18.

FIG. 20 is a diagram illustrating a configuration of a first divided print portion and a second divided print portion during actual printing of applying a variable weight concept of each gradation density according to a print progress direction in the overlapping connection portion of the divided images and a print start position and a print end position of gradation of the overlapping connection portion consisting of a rear end and a front end of each the first divided print portion and the second divided print portion, in the digital print image-connecting continuous printing method capable of hiding stitching lines according to the present invention.

FIG. 21 is a photograph showing another actual case of applying the digital print image-connecting continuous printing method capable of hiding stitching lines according to the present invention illustrated in FIGS. 18 and 19. (P) illustrates an overall unit image (length: L) to be printed, and (A) and (B) are diagrams of applying a complementary gradation printing method by dividing a unit image P into two divided images and giving weights of the print density of the overlapping connection portion applied to each of a print end portion and a print front end of these divided images.

FIG. 22 is a diagram illustrating a minus gradation printing method in a first divided image to be first printed and an overlapping area in printing the unit image illustrated in FIG. 21 together with an operation of the core portion of the digital printer engine.

FIG. 23 is a diagram illustrating a state of a core portion of a digital printer engine immediately before plus gradation printing starts in an overlapping area of the second divided image to be printed subsequently in the printing of the unit image illustrated in FIG. 21.

FIG. 24 is a diagram illustrated in connection with FIGS. 22 and 23 and a diagram illustrating that a first divided image and a second divided image are connected and printed.

FIG. 25 is a schematic diagram illustrating that start and end portions of the gradation of the overlapping connection portion form a wave-type gradation in the second embodiment of the digital print image-connecting continuous printing method capable of hiding stitching lines according to the present invention.

FIG. 26 is a schematic diagram illustrating that a wave-shaped gradation at the start and end portions of the gradation has a variable wave waveform according to the degree of complexity of the printed color, in the second embodiment of the digital print image-connecting continuous printing method capable of hiding stitching lines according to the present invention.

FIG. 27 is a diagram illustrating examples in which a wave-type gradation form implemented in a connection portion (overlapping area) may be pattern-set in various forms such as a plurality of straight lines and free curves in advance, in the second embodiment of the digital print image-connecting continuous printing method capable of hiding stitching lines according to the present invention.

(A), (B) and (C) of FIG. 28 are diagrams illustrating the concepts of lightness, saturation, and hue.

FIG. 29 is a diagram illustrating a flowchart example of a process for performing a digital print image-connecting continuous printing method capable of hiding stitching lines according to the present invention.

(A) Of FIG. 30 to (E) of FIG. 30 are diagrams illustrating examples of gradation patterns related to the presence or absence of letters in an overlapping area and the shape of the letters.

(A) of FIG. 31 to (D) of FIG. 31 are diagrams illustrating gradation forms when there is a difference in lightness and saturation of colors in images in an overlapping area.

(A) of FIG. 32 to (B) of FIG. 32 are diagrams illustrating examples of image classification categories for determining the length of an overlapping area.

BEST MODE

The terms used in the present specification will be described in brief and the present invention will be described in detail.

The terms used in the embodiment of the present invention are selected from general terms which are currently widely used as possible by considering functions in the present invention, but may vary depending on an intention of those skilled in the art, a precedent, emergence of new technology, etc. Further, in a specific case, there are terms arbitrarily selected by an applicant, and in this case, the meanings of the terms will be disclosed in detail in a corresponding description part of the present invention. Accordingly, the terms used herein should be defined based on not just names of the terms but the meanings of the terms and the contents throughout the present invention.

The embodiments of the present invention may have various modifications and various exemplary embodiments and specific exemplary embodiments will be illustrated in the drawings and described in detail in the detailed description. However, it should be understood that this is not intended to limit the scope to specific embodiments, and includes all the modifications, equivalents and replacements included in the spirit and the technical scope of the invention. In describing the embodiments, a detailed description of related known technologies will be omitted if it is determined that they make the gist of the present invention unclear.

The terms such as first, second and the like may be used for describing various components, but the components are not limited by the terms. The terms are used only to discriminate one component from the other component.

The singular expression includes the plural expression unless the context clearly dictates otherwise. It is to be understood that the term “comprise” or “consist of” as used in the present specification is intended to designate the presence of stated features, numbers, steps, operations, components, parts or combinations thereof, but not to preclude the possibility of the presence or addition of one or more other features, numbers, steps, operations, components, parts, or combinations thereof.

In the embodiment of the present invention, a ‘module’ or ‘unit’ performs at least one function or operation, and may be implemented in hardware or software or in a combination of hardware and software. In addition, a plurality of ‘modules’ or a plurality of ‘units’ are integrated into at least one module and implemented by at least one processor (not shown), except for ‘modules’ or ‘units’ that need to be implemented with specific hardware.

In the embodiment of the present invention, when a part is said to be “connected” to another part, it includes not only when it is “directly connected” but also when it is “electrically connected” with the other element interposed therebetween. In addition, when a part “includes” a certain component, it means that it does not exclude other components but may further include other components unless otherwise stated.

Hereinafter, the present invention will be described in detail referring to the accompanying drawings so that those of ordinary skill in the art can easily carry out the present invention. However, the present invention may be embodied in various different forms and is not limited to the embodiments described herein. In order to clearly explain the present invention, parts irrelevant to the description are omitted, and the same reference numerals are assigned to the same or similar elements throughout the specification.

FIGS. 6 to 12 are diagrams sequentially describing an example of a printing process for each step in which when printing a digital image on a printing fabric 7 unwound from a un-winder roll 10 (fabric roll), the digital image is divided into multiple (two) images and the two divided images are operatively connected and printed, when the length of an in-line progress direction of a unit image to be obtained is longer than a circumferential length R of a photo imaging plate 3 of the digital printer.

First, FIG. 6 is a diagram schematically showing the overall configuration of the digital printer, which enlarges and shows a core unit C of the print engine in a dotted line circle, and shows a state in which as one of the components of a fabric direction switching mechanism, a pair of upper and lower fabric horizontal reciprocating transfer rollers HR1 and HR2, which simultaneously reciprocate in the left and right direction along a horizontal guide rail GR, are moved to a position for starting printing (the left end of the guide rail GR).

As can be seen in FIG. 6, a fabric 7 continuously unwound from the un-winder roll 10 is supplied between a blanket 4 and a print roller 6 through a first forward and reverse drive roller R1, an upper reciprocating transfer roller HR1 of the fabric, and a second forward and reverse drive roller R2 (here, a transfer path of non-printing portion of an abnormal fabric). In addition, the fabric passing through the blanket 4 and the print roller 6 is printed by receiving a predetermined print image 5 filmed from the blanket 4 while the print roller 6 rotates in contact with the blanket 4, and then re-wound on a re-winder roll 50 (re-winder roll of the printing fabric) through a third forward and reverse drive roller R3, a lower reciprocating transfer roller HR2, and a fourth forward and reverse drive roller R4 (here, a transfer path of printing portion of the printed fabric).

In the digital printer engine such as a configuration, as the above-mentioned pair of upper and lower fabric horizontal reciprocating transfer rollers HR1 and HR2 reciprocate left and right along the guide rail GR at predetermined time intervals, the forward and reverse drive directions of the forward and reverse drive rollers R1 to R4 are switched. While the horizontal reciprocating transfer rollers HR1 and HR2 are moving to the right on the drawing, the moving direction of the fabric is the forward direction (a direction in which printing proceeds), and on the contrary, while the horizontal direction reciprocating transfer rollers HR1 and HR2 are moving to the left in the drawing, the moving direction of the fabric is the reverse direction, and the printing is stopped while the fabric is moving in the reverse direction. When the moving direction of the fabric is the reverse direction, the positioning operation for connecting and printing the beginning of the second divided image to the end of the first divided image will be described in detail below with reference to other drawings. Non-described reference numeral 20 is a component (e.g., primer treatment unit) for pre-processing the fabric suitable for printing, and in other drawings, reference numeral 20 is omitted.

When between an in-line progressing direction length L of the unit image printed on the fabric 7 and a circumferential length R of the photo imaging plate 3, for example, the latter is an integer multiple of the former ($R=n\times L$, n is a natural number), the relationship is enough to drive the print roller 6 in one direction all the time without changing the transfer direction of the fabric. When the latter is a relation other than an integer multiple of the former, a predetermined length of overlapping printing of the fabric is formed into a non-printing portion in order to prevent the occurrence of a portion where another image is overprinted or to prevent waste of fabric due to the occurrence of a remnant non-printing portion, and the non-printing portion returns in the reverse direction to be positioned so that a subsequent printing position is connected and then printed continuously. In addition, when the in-line progress direction length L of the unit image printed on the fabric 7 unwound from the un-winder roll 10 is longer than the circumferential length R of the photo imaging plate 3 of the digital printer ($L>R$), the unit image to be obtained is divided into a plurality (two) of images to be operatively connected and printed at a time interval. Even in the case, it is necessary to connect and print the subsequent divided image to the previous divided image by intermittently inverting the transfer direction of the original fabric 7 to match the position of the connection portion. The present invention is particularly a technique to be applied to the latter case where the size (length) of the unit image to be printed is longer than the circumferential length R of the photo imaging plate 3. Hereinafter, when the in-line progress direction length L of the unit image printed on the fabric is longer than the circumferential length R of the photo imaging plate of the digital printer, a process of dividing the unit image into a plurality of images (a first divided image to be printed first and a second divided image to be printed subsequently) and operatively connecting and printing the divided images at a time interval will be described with reference to FIGS. 7 to 12.

FIGS. 7 to 9 are diagrams sequentially illustrating a process for printing the first divided image to be printed first among the two divided images. FIG. 7 is a diagram illustrating a state in which a pair of upper and lower horizontal reciprocating transfer rollers HR1 and HR2 start to be transferred to the right side of the drawing while moved to the leftmost side of the drawing along the guide rail GR (the state of FIG. 7), and then the printing starts from a front end (start portion) of the first divided image, FIG. 8 is a diagram illustrating a state in which the printing is further performed in FIG. 7, and FIG. 9 is a diagram illustrating a state in which the printing is further performed in FIG. 8.

As each of these steps illustrated in FIGS. 7 to 9 is performed, the first divided image to be printed first is obtained on the cylindrical photo-imaging plate 3. Thereafter, while the outer circumferential surface of the blanket 4 is in contact with the photo imaging plate 3, the former rotates counterclockwise and the latter rotates clockwise, so that the first divided image applied to the photo imaging plate 3 is transferred to the blanket 4 and then transferred to the fabric during an engaging transfer operation in cooperation with the print roller 6. Through these steps, the first divided image is printed on the fabric.

FIG. 10 is a diagram showing a state in which the printing process is further performed subsequently to FIG. 9. The fabric further proceeds beyond the print roller 6 in a non-printing state by the length of the second divided image after the point at which the first divided image has been printed, but such a non-printing overrun progresses until the pair of upper and lower horizontal reciprocating transfer rollers HR1 and HR2 reaches the position (the position reaching the right end) which has moved to the right direction thereof, and while the length of the second divided image is overrun in a non-printing state, the process of generating the subsequent second divided image on the plate 3 proceeds.

FIGS. 11 and 12 are diagrams showing a process in which the horizontal reciprocating transfer rollers HR1 and HR2 start to be transferred in the left direction again after the step illustrated in FIG. 10. From this time, the fabric 7 proceeds in the reverse direction, and at this time, the print roller 6 is spaced apart from the blanket 4 at a gap G.

FIG. 12 is a diagram showing a state in which the horizontal reciprocating transfer rollers HR1 and HR2 are transferred to the leftmost side of the guide rail GR, following FIG. 11. The feedback (reverse movement) of the non-printing section for printing the second divided image, which has been overrun, was completed as the drive directions of the forward and reverse drive rollers R1 to R4 are all changed to the reverse direction along with the leftward movement of the horizontal reciprocating transfer rollers HR1 and HR2, so that the non-printing section for printing the second split image that has been overrun is fed-back (reversely moved) and transferred to the position connected with the first divided image. Meanwhile, the second divided image printed on the plate 3 is transferred to the blanket 4 while the reverse direction of the fabric continues.

When the feedback of the printing fabric is completed, the print roller 6 is in contact with the blanket 4 again, and by this operation, the reverse movement of the printing fabric proceeds, and after the starting point of the non-printing section reaches the point where the first divided image is connected, the print roller 6 again forms a contact position which returns to the press-contact state to the blanket 4, and the drive direction of the forward and reverse drive rollers R1 to R4 is changed to the forward direction again so that the progress direction of the fabric is forward and thus, the second divided image is connected to the first divided image and continuously printed. Thereafter, a driving pattern of the digital printer components at the time of printing the second divided image is the same as that of FIG. 7 and later described above. By repeating this cycle, long in-line image-connecting continuous printing of roll-to-roll digital printing is possible.

As described above, the print roller 6 rotating in contact with the blanket 4 is separated from the blanket 4 and the contact position maintaining the press-contact state to the blanket 4 and operatively and variably moves by repeating between separation positions having a gap G at a predetermined time interval. In addition, the left and right reciprocating movement of the horizontal reciprocating transfer rollers HR1 and HR2 that provide forward and reverse movement direction switching for the fabric and transfer force or tension adjustment force for the fabric, the forward and reverse drive movement of a plurality of forward and reverse drive rollers, and the like are organically combined by a predetermined computer program set in advance to perform a continuous printing method of connecting a plurality of divided images using a roll-to-roll type digital printer.

FIG. 13 is a diagram (FIG. 13B) showing a basic technical idea in which a predetermined portion GZ of two divided images is configured as an overlapping connection portion to prevent stitching lines from occurring due to a gradation printing principle of the overlapping connection portion, compared to the fact that a predetermined stitching line is exposed at the connection portion of the divided images according to a conventional digital printing technique (FIG. 13A). FIG. 14 is a diagram showing a gradation distribution of each printing density in the overlapping connection portion of FIG. 13B and a description principle of a gradation configuration in more detail along the printing progress direction of each divided image.

FIG. 13 is a schematic diagram (FIG. 13B) proposed to prevent stitching lines from occurring by a linear inverse proportional gradation printing principle in the overlapping connection portion as a method of connecting divided images provided with an overlapping connection portion GZ of a predetermined width, compared to a case of a conventional printing type (FIG. 13A) in which the stitching line SL is exposed at the connection portion by using the roll-to-roll digital printer described above, but connecting the divided images according to a line point at a specific portion. In addition, as can be seen from FIG. 14, the existence of the overlapping connection portion GZ along with the printing progress direction of each divided image, the complementary gradation distribution pattern in the overlapping connection portion, and the gradation start position and end position are illustrated. Here, the complementary relationship of the gradation distribution pattern means that an arithmetic addition value of a minus gradation print density value on the first divided image side and a plus gradation density value on the second divided image side at any position of the overlapping connection portion is the same as the density value of the original image of the overlapping area thereof. In order to achieve this relationship, the minus gradation print density value and the plus gradation density value are changed linearly so as to form a linear functional (linear) complementary relationship with each other.

As can be seen in FIGS. 13 and 14, in the conventional digital print image-connecting continuous printing method (FIG. 13A), a unit image P to be printed is divided into two divided images P(A) and P(B) and the divided images are connected and printed by connecting the connection portion to a typical line point without its printing longitudinal width, so that the stitching line SL clearly appears at the connection portion. On the contrary, in the printing method (FIG. 13B) with an overlapping area of a predetermined width, in order to solve this problem, a predetermined section of the two divided images P(A) and P(B) is configured as an overlapping connection portion. A predetermined width W1 of the first divided image A in a longitudinal direction of the rear end side of the printing direction and a predetermined width W2 of the second divided image B in a longitudinal direction of the front end side of the printing direction are the same as each other (W1=W2) and the images of the portion are the same as each other to form an overlapping surface-contact gradation area GZ. As the first divided image P(A) is printed in the longitudinal direction in the surface-contact gradation area GZ, the first divided image P(A) is printed with a minus gradation technique in which the print density gradually decreases in a linear functional manner (linearly), and as the second divided image P(B) is printed in the longitudinal direction in the surface-contact gradation area GZ, the second divided image P(B) is printed with a plus gradation technique in which the print density gradually increases in a linear functional manner (linearly).

Here, the print density means a print density that is varied by adding or subtracting the number of nano-sized ink droplets ejected from an ink ejection nozzle (reference numeral 2 in FIG. 1). The minus gradation printing, which lowers the density, is performed by an operation of gradually reducing the number of ink droplets ejected through the ink ejection nozzle even at the same fabric transfer speed along the printing progress direction. On the contrary, the plus gradation printing is performed by an operation of gradually increasing the number of ink droplets ejected through the ink ejection nozzle even at the same fabric transfer speed along the printing progress direction.

However, the minus gradation technique in which the print density gradually decreases in a linear functional manner (linearly) and the plus gradation technique in which the printing density gradually increases in a linear functional manner (linearly) are applied to the overlapping area of the two divided images. Thus, as illustrated in FIGS. 2 and 3, the sharp and clear linear stitching lines have disappeared, but as shown in FIG. 15, there is a problem that a color density lowering portion (color density lowering line) of a predetermined width occurs in the overlapping connection portion of the two divided images P(A) and P(B). Although this color density lowering portion is different from the conventional sharp and dark linear stitching line, the color density lowering portion is also seen as a kind of wide stitching line, so that it has been found that a solution thereto is necessary.

Although the degree varies somewhat depending on the type of color or the content of the printed image, the present inventors have thoroughly researched and examined a cause of a new problem of the density lowering portion in many cases, and as a result, found the following facts.

That is, in the printing, the reason why most of natural colors may be expressed even using only limited colors of ink such as four colors of Cyan, Magenta, Yellow, and Black is that the printing is performed in the form of halftone dots in an elaborate lattice structure for each color, the halftone dots are uniformly disposed and printed in an empty space between meshes so that pixels (halftone dots) are not overlapped with each other while the number of colors (ink droplets) are adjusted according to a density to be expressed by these colors. If the positions of the halftone dots printed for each color are the same and overlapped and printed, printed images of various colors are not properly expressed.

In the field of a digital printer to which the present invention pertains, the ink particles of sizes of 1 to 10 nanometers of each color pixel ejected from the ink ejection nozzle 2 are uniformly prepared and arranged without overlapping for each color and applied on a photo imaging plate according to a predetermined homogeneous mesh pattern. The repeating process of ejecting and printing the first rotation of the photo imaging plate (drum) from beginning to end with one pigment and then ejecting and printing the next rotation of the photo imaging plate (drum) from beginning to end with another pigment is fully completed for each color and a complete image is applied on the photo-imaging plate (drum) by determining a combined set of printing meshes.

However, in the case of overprinting with a new printing cycle on a predetermined area already printed by a previous cycle by a method of driving the printing fabric in forward and reverse directions, the printing of the following cycle needs to be performed for the empty mesh space between the pigment (pixel) and the pixel that has been printed by a preceding cycle, but for ultra-fine pixels (1 to 10 nanometers in size), it is virtually impossible to fit these mesh pins by mechanical positioning of the fabric. As another example, when 100% of a monochromatic yellow color is to be printed, printing 100% of a yellow color by a single cycle, and printing first with 50% of a yellow color and then overlaying and printing 50% of yellow color thereon in a subsequent cycle (re-determining the position of the printing fabric). As a result, the reason why it is impossible to obtain 100% of yellow color as a whole is that the pixels of a subsequent cycle are printed by the previous cycle, which is due to a change in the position of the printing fabric.

FIGS. 16 and 17 are diagrams for describing the process in more detail, and FIG. 16 is a schematic diagram for describing a reason why when overlapping and printing twice with a time interval, even if the number of print ink droplets is equally doubled, the printed density cannot be doubled. That is, in FIG. 16, assuming that, for example, 4 ink droplets are ejected on the left side, and when the printing density is doubled by a total of 8 droplets by adding 4 ink droplets on the fabric again, if the position of the fabric to be ejected when additional 4 ink droplets are ejected is different from that of the first printing (i.e., if the fabric is not precisely positioned at the same position), as illustrated in FIGS. 16A to 16D, it was found that since the ink droplets are not attached to an empty space of the fabric, but are arbitrarily attached to overlap on the first ejected ink droplets, the print density is not arithmetically proportional to the number of ejected droplets. This is an inevitable phenomenon that occurs because it is difficult to match the positioning of the fabric to the level of 1 to 10 nanometers by physical means or manipulation, whereas the size of the ink droplet is extremely minute, 1 to 10 nanometers.

In addition, FIG. 17 shows the aforementioned research and examination results as in FIG. 16 from a viewpoint of increasing the size of the printed original. In the case of printing in the minus gradation method in which the print density gradually decreases in the printing progress direction (arrow direction) shown on the left in FIGS. 17, (1), (2), and (3) expressed at the top may be regular printing ink mesh patterns that may be obtained by reducing the number of ink droplets ejected while the printing fabric is fixed, but (4), (5), and (6) expressed at the bottom cannot obtain uniform print ink mesh patterns even if the number of ink droplets ejected is a minus gradation of the same ratio as the case of the top as the minus gradation printing performed after re-positioning by changing the position of the printed fabric. The present inventors have understood the reason why a color density lowering portion (color density lowering line) of a predetermined width occurs in the overlapping connection portion of the two divided images P(A) and P(B) in FIG. 15.

When thinking superficially, it is easy to think that the higher the number of ink droplets to be ejected, the higher the printing density in proportion thereto, but as described above, in the field of digital printing to which the present invention pertains, it is a technical problem if not, and the present inventors have found that the reason is as follows as a result of many experiments and examination results.

When the ink droplets are ejected and printed, if the ejection nozzle and the printing fabric are both disposed in a fixed position and printed, there is a homogeneous correlation (for example, a proportional relation) between the ejection amount of ink droplets and the density of the printed result. Like the present invention, one image is divided into two front and rear images, but when the images are equally set with respect to predetermined widths of the rear end and the front end of the divided images and then overlapped and printed at a time interval, if the printing position is differently moved even in any one of the ejection nozzle and the printing fabric, the ejection amount of the ink droplets and the density of the printed result cannot obtain a homogeneous proportional correlation. The reason is that it is difficult to position the location of the printing fabric where the second printing is made to the same location where the first printing is made, during repeated printing for the overlapping area with a time interval. The technical field to which the present invention is applied is a digital printing field in which the size of the ink droplets to be ejected is 1 to 10 nanometers (1 nanometer=$10^{-9}$ meters), which is a method of ejecting ink particles of extremely small sizes. The ink ejection nozzle ejects ink droplets from a constantly fixed location, but this is because the printing fabric on which the ink droplets are transferred is printed in a state where the supply direction is changed and fed-back at predetermined intervals, so that the printing position of the overlapping area of the printing fabric is not constant.

In the present invention, a process of deriving these problems (solving problems) is very important, and the process of recognizing problems and understanding their causes is summarized once again as follows.

An image having a predetermined width in the longitudinal direction of the rear end of the first divided image A to be previously printed and an image having a predetermined width in the longitudinal direction of the front end of the second divided image B to be subsequently printed equally overlap with each other to form an overlapping area GZ. The first divided image A is printed by a minus gradation method in which the ink density (the number of ink droplets to be ejected) gradually decreases as the printing is performed in the longitudinal direction in the overlapping area GZ, and the second divided image B is overlapped and printed by a plus gradation method in which the ink density (the number of ink droplets to be ejected) gradually increases as the printing is performed in the longitudinal direction in the overlapping area. However, the first divided image A is printed by a minus gradation method in which the ink density decreases linearly (straightly) from 100% to 0% in the overlapping area GZ as the printing is performed in the longitudinal direction, and the second divided image B is printed by a plus gradation method in which the ink density increases linearly (straightly) from 0% to 100% in the overlapping area GZ as the printing is performed in the longitudinal direction. The intention to obtain the primary color density by designing so that the arithmetic (additive) sum of the gradation density at the same position between the divided images is 100% is determined as a fault (occurrence of the color density lowering portion (color density lowering line) in the center of the overlapping connection portion shown in FIG. 15). The cause is an unavoidable phenomenon that occurs because the fabric on which the second divided image B is printed cannot be positioned exactly at the same position as the location of the fabric on which the first divided image is printed.

Accordingly, even if conventional sharp linear stitching lines may be avoided by printing with different gradations between divided images in the method of overlapping and printing a predetermined width portion by feeding back the printing fabric, as another problem, according to the conclusion that a new problem such as a color density lowering portion inevitably occurs, in order to solve the problem, the present inventors found a method of giving a weight (additional increase of the number of ejected ink droplets) of a gradation density.

The present invention basically shares a basic technical idea that an image having a predetermined width in the longitudinal direction of the rear end of the first divided image A to be previously printed and an image having a predetermined width in the longitudinal direction of the front end of the second divided image B to be subsequently printed equally overlap with each other to form an overlapping area GZ, and the first divided image A is printed by a minus gradation method in which the ink density gradually decreases as the printing is performed in the longitudinal direction in the overlapping area GZ, and the second divided image B is printed by a plus gradation method in which the ink density gradually increases as the printing is performed in the longitudinal direction in the overlapping area. However, the first divided image A is printed by a non-linear (non-straight) minus gradation method, that is, a method of adding an additional density (a method of further adding the number of ejected ink droplets) according to the printing progress direction, other than a method in which the ink density gradually decreases linearly (straightly) from 100% to 0% in the overlapping area GZ as the printing is performed in the longitudinal direction. Similarly, the second divided image B is also printed by a non-linear (non-straight) plus gradation method, that is, a method of adding an additional density (a method of further adding the number of ejected ink droplets) according to the printing progress direction, other than a method in which the ink density gradually increases linearly (straightly) from 0% to 100% in the overlapping area GZ as the printing is performed in the longitudinal direction. As a result, the arithmetic sum (arithmetic addition of the number of ejected ink droplets) between the gradually decreased density and the gradually increased density exceeds 100%, preferably 110% to 170%, compared to the original image at any position throughout the overlapping area GZ where the printing is performed, and then the present invention is completed.

FIG. 18 is a schematic diagram illustrating a non-linear gradation application of adding an additional density value 5 to a change in linear density ε, while applying gradual decrease and increase gradations in the overlapping area GZ, which is a key point of the digital print image-connecting continuous printing method according to the present invention, instead of FIGS. 13 and 14B. In FIG. 18, vertical red lines illustrate start lines GZS1 and GZS2 to which gradation is applied, that is, positions where each overlapping area GZ of the first divided image PA and the second divided image PB starts, and vertical green lines illustrate lines GZE1 and GZS2 to which gradation is applied, that is, positions where each overlapping area GZ of the first divided image PA and the second divided image PB ends. In addition, in FIG. 18, as illustrated in the right side on the drawings of FIGS. 13 and 14, it can be seen that an additional convex curve (reference numeral CL in FIG. 19) is illustrated on the slope of an oblique side of a right triangle with plus (+) and minus (−) signs in a progress pattern of a gradation color density change in each overlapping area GZ of the first divided image PA and the second divided image PB, which is one of decisive features of the present invention.

The concept of variable weighting of each gradation density value according to the printing progress direction in the overlapping connection portion of the divided image according to the present invention will be described in more detail with reference to FIG. 19.

FIGS. 19A and 19B are diagrams illustrating changes in gradation print density values and weights thereof in detail in each overlapping area GZ of the first divided image PA and the second divided image PB, respectively. In these drawings, oblique sides SL1 and SL2 of the triangle are change lines of linear gradation density ε according to a concept of minus gradation in which the ink density gradually decreases linearly (straightly) from 100% to 0% in the overlapping area GZ as the first divided image PA and the second divided image PB are printed in the longitudinal direction (this is a concept applied when performing the printing method presented in FIGS. 13 and 14 described above). An upward convex curve CL1 and a downward convex curve CL2 covering the oblique sides SL1 and SL2 of the triangle illustrate ink densities δ1 and δ2 further variably added in the overlapping region GZ as the first divided image PA and the second divided image PB are printed in the longitudinal direction.

As a result of many experiments and studies, it was confirmed that when a change curve of the additionally added ink density 5 is curved rather than a straight line, a problem of the color density lowering portion (color density lowering line) on the overlapping connection portion of the final print is significantly improved. Specifically, when the lines CL1 and CL2 of the additionally added ink densities δ1 and δ2 have non-linear curve changes that gradually increase and then gradually decrease in the print progress direction on the change lines of linear gradation densities ε1 and ε2, an optimal result was obtained, which is preferably $110\%<\varepsilon1+\delta1+\varepsilon2+\delta2<170\%$ when expressed as a formula.

Here, ε1 is a value expressed as % of an ink density value at a predetermined position as compared to a density value of the original image when assuming a minus gradation line SL1 that gradually decreases the ink density value linearly (straightly) from 100% to 0% at a predetermined position of the first divided image in the overlapping area GZ. δ1 is a value expressed as % of the ink density value further added to the ε1 value compared to the density value of the original image. δ2 is a value expressed as % of an ink density value at a predetermined position as compared to a density value of the original image when assuming a plus gradation line SL2 that gradually increases the ink density value linearly (straightly) from 0% to 100% at a predetermined position of the second divided image in the overlapping area GZ. In addition, δ2 is a value expressed as % of the ink density value further added to the ε2 value compared to the density value of the original image.

A preferred value of ε1+δ1+ε2+δ2 is 110%<ε1+δ1+ε2+δ2<170%, and the reason for being expressed in a variable region range is that the adding density weight 5 considers a change capable of effectively corresponding to the diversity of the shape of the image to be printed as the number or shape of colors of the printed image is arbitrary (various types of original print images). For example, it is preferred that the closer the image of the overlapping area is to a monochromatic color, the higher the weight is given, and the more multicolored and complex the image of the overlapping area is, the lower the weight is given. Considering all these variable variability, a vertical of 110%<ε1+δ1+ε2+δ2<170% was derived.

Meanwhile, in FIG. 18, as an experimental result of applying the present invention to various long unit images, it is determined that the sizes of the widths W1 and W2 of the overlapping GZ in the printing direction are preferably within a range of 5% to 50% of the total length of the first divided image PA or the second divided image PB in the printing direction, and it was determined that it is preferred that a numeral value is at least 5 mm or more. The determination of the width of the overlapping area GZ in the printing longitudinal direction is also a reference that reflects a result that may be set as a large width as the image in the overlapping area GZ is monochromatic and configured as a narrow width as the image in the overlapping area is multicolored and complex in shape.

FIG. 20 is a diagram of applying a digital print image-connecting continuous printing method capable of hiding stitching lines according to the present invention, and a diagram illustrating a print start position of each overlapping connection portion and a print end position of the overlapping connection portion of the first divided print portion and the second divided print portion.

In FIG. 20, (P) illustrates an overall unit image to be printed, and (A) and (B) illustrate overlapping connection portions C; D; GZ which are applied to a print end portion C and a print front portion D by dividing the unit image P into two divided images, respectively. In reference numerals, GZS1 and GZS2 illustrate starting positions of the gradation in each overlapping area C; D; GZ of the first divided image A and the second divided image B, that is, starting lines to which the gradation is applied, and GZE1 and GZS2 illustrate ending positions of the gradation in each overlapping area C; D; GZ of the first divided image A and the second divided image B, that is, ending lines to which the gradation is applied.

FIG. 21 is a diagram illustrating a process of applying a digital print image-connecting continuous printing method capable of hiding stitching lines according to the present invention, using another actual printed image, similarly to FIG. 20. In FIG. 21, when describing the contents of a unit image P, images of a portion A of two characters at the top and a portion B of wine and wine glass on the table at the bottom are clearly distinguished by a black horizontal line that divides the portions, and the divided images may be set as a first divided image and a second divided image based on the horizontal dividing line, respectively. In this case, not only the difference in lightness is clear, but also the contents of the images are clearly distinguished, and thus even if a conventional stitching line is formed on the horizontal dividing line, the stitching line may not be visually exposed. However, if the length of the second divided image on the lower side is greater than the circumference length of the photo imaging plate, the overlapping area GZ to be overprinted with the divided images may not be placed at a bottleneck position as shown in the drawing, and thus a gradation pattern criterion to be applied at this time is as described above.

FIG. 22 is a diagram illustrating a non-linear minus gradation print pattern in a first divided image P(A) to be first printed and an overlapping area GZ in printing the unit image illustrated in FIG. 21 together with an operation of the core portion of the digital printer engine. FIG. 23 is a diagram illustrating a state of the core portion of the digital printer engine immediately before non-linear plus gradation printing starts in an overlapping area GZ of the second divided image P(B) to be printed subsequently to FIG. 22 in the printing of the unit image illustrated in FIG. 21.

In addition, FIG. 24 is a diagram illustrated in connection with FIGS. 22 and 23, and a digital print image-connecting continuous printing method capable of completely hiding stitching lines and print density lowering portions in divided image overlapping areas by applying a non-linear (that is, weighted) complementary gradation method described in FIGS. 18 and 19 in the overlapping area GZ between the first divided image P(A) and the second divided image P(B).

FIG. 25 illustrates a second embodiment of a digital print image-connecting continuous printing method capable of completely hiding stitching lines according to the present invention. As compared with the above-described embodiment in which the start and end portions of the gradation of the overlapping connection portion are linear, the second embodiment further reduces the gradation change that may be grasped by the human eye by giving a change in the print density of a wave-type gradation in a two-width direction and as a result, may further improve the hidden effect of the stitching lines. In the case of linear gradation printing, overlapping errors depending on a fabric material and staining due to the nature of printing may occur, whereas a wave gradation method so that the color of the image connection portion is connected more naturally as much as possible by visually dispersing the errors and staining is a method provided as the second embodiment of the present invention to connect images.

FIG. 26 is a diagram illustrating that it is preferred that a wave-shaped gradation at the start and end portions of the gradation has a variable wave waveform according to the degree of complexity of the printed color, in the second embodiment of the digital print image-connecting continuous printing method capable of hiding stitching lines according to the present invention. The wave pattern is closer to a straight line as the types of colors of the printed image in the overlapping connection portion increase (e.g., in the case of (1)), and as the color is closer to a monochromatic color (e.g., as in the case of (8)), it is preferable to increase the number of waveforms in which valleys and peaks alternate.

In FIG. 27, in the second embodiment of the digital print image-connecting continuous printing method capable of hiding stitching lines according to the present invention, the wave-type gradation form implemented in the connection portion (overlapping area) may be various forms such as combined forms (1) (2) (3) of a plurality of straight lines and free curves (5) (6) (7), and may also be a combination of straight lines and curves (not illustrated). The shape of the gradation pattern in the width direction of the printing fabric of the overlapping connection portion may be formed made by color analysis of an overlapping area image to be printed, and appropriate gradation shapes according to color analysis are automatically and semi-automatically selected through a process of comparison with preset database information.

Meanwhile, since a basic understanding of lightness, saturation, and hue is required in relation to the determination of the gradation pattern, a brief description thereof is as follows. FIGS. 28A, 28B, and 28C are diagrams illustrating the concepts of lightness, saturation, and hue.

The lightness is one of the three main attributes of color together with hue and saturation, and is commonly expressed as 'dark' when the lightness is low, and 'bright' when the lightness is high. For example, the lightness is used with 'dark gray' and 'light gray'. The lightness is one of the sensory factors that distinguish color, and indicates the blight and dark degree in which the eye perceives by color (wavelength of light) in addition to reflectance. As illustrated in FIG. 28A, in the Munsell color system for indicating the colors of an object, black is 0, white is 10, and gray levels are sequentially numbered and displayed, with a total of 11 levels of lightness from 0 to 10. It is common to observe a color in contrast with other colors rather than seeing the color itself, so that the lightness of the color may be seen differently depending on a relative color. For example, the same gray paper appears lighter gray when placed on black paper than when placed on white paper. This phenomenon is called lightness contrast.

The saturation, as illustrated in FIG. 28B, is a degree of saturation that indicates thick or thin color. Clear, clean, and close to the primary color without mixing anything is expressed as having high saturation. For example, the red of canna flower and the red of red bean have similar lightness, but the canna flower is much clearer, and thus the saturation of canna flower is higher than that of red bean. The saturation increases as it is closer to a spectral color, and a color with the highest saturation in a color is called a 'pure color' of the color. White and black are called "achromatic colors" because there is no saturation.

In addition, as illustrated in FIG. 28C, the hue is a concept that integrates lightness and saturation among three color attributes of lightness, saturation, and hue, and refers to the atmosphere such as brightness, strength, and shading of a color that changes according to the degree of lightness and saturation. The hue is also called tone as its English name. For example, the light or dark state of the color is called 'light hue (light tone)' or 'dark hue (dark tone)' depending on the degree, and refers to 'clear hue (clear tone)', turbid hue (turbid tone)', etc. according to the clearness and turbidity of the color. In a narrow sense, the hue refers to a color created by mixing gray with a pure color. At this time, the hue is used separately from 'tint' and 'shade', and the tint is a hue created by mixing a pure color with white, and the shade is a hue created by mixing a pure color with black. A common hue is 'halftone'.

The sophisticated color implementation of the image implemented in the printings is performed by a Raster Image Processor (RIP), and the RIP is output software used for outputting images, etc., operated in programs such as word processors, database management programs, and Photoshop, and a device consisting of a computer chip including a microprocessor for switching vector graphics, text, or both into bitmap images and software. The RIP is software that may perform desired color printing like a real thing, freely enlarge and reduce data, produce faster output speed, and enable actual printing with various functions such as supporting various fonts and divided printing. The main functions supported by the RIP software enable functions such as color adjustment, ink ejection amount control, and halftone dot control without damaging an original image, depending on a product.

FIG. 29 is a diagram illustrating a flowchart example of a process for performing a digital print image-connecting continuous printing method capable of hiding stitching lines according to the present invention.

As can be seen from FIG. 29, the image-connecting continuous printing method according to the present invention performs color analysis 13 on an image separation surface when a printer 16 receives an image to be printed from a terminal 12. As a result of color analysis, a gradation shape 14 for the separation surface of the image is determined and an overlap length of the gradation of the image separation surface is set (15), but configured with a narrow width as the image is multicolored and the shape is complex.

As a result of performing the printing by a test printer 16 by applying the determined gradation pattern and the test printing, there is a process flowchart of performing print quality examination (17) to determine whether the overlapped image has stitching lines or stains, returning to the setting (14) of the gradation form on the image separation surface and re-determining the gradation form on the image separation surface, and newly setting (15) the overlapping length to perform continuous digital printing when the quality is satisfied through the test process (17) so as not to generate stitching lines.

In such a process, the gradation form setting and gradation overlapping length setting according to the color analysis of the image separation surface are automatically performed by comparing and matching automatic analysis results such as the number of hues and the grade (difference in lightness and saturation) of hue considering lightness and saturation of the overlapping area image made by the RIP with database information of preset gradation patterns and overlapping lengths, and in the print quality examination (17), the setting of a new pattern according to insufficient quality is performed semi-automatically with human judgment added.

The process of determining the gradation patterns and overlapping lengths (process of determining the pattern determination variables) will be described in more detail for the wave gradation of the second embodiment of the present invention. First, as a gradation pattern determining variable, a case where there are characters (letters) in the overlapping area and a case where there are only colors without letters will be separately described.

1. Presence of Characters in Overlapping Area and Gradation Form Related to Pattern Presence of characters in an overlapping area and a gradation form related to a pattern may be divided into five cases, as illustrated in FIGS. 30A to 30E. As illustrated in FIG. 30A, all monochromatic background images without characters or images within an overlapping area are overprinted by applying a wave gradation, as illustrated in FIG. 30B, when there are all monochromatic background images, gradation is applied so that waves are formed on the monochromatic image background by avoiding the character portion, and as illustrated in FIGS. 30C and 30D, when a background image is white, the white area is printed without gradation. In addition, as illustrated in FIG. 30E, when the background color of the overlapping area is white, an overlapping line is generated by avoiding overlapping of letters, and only the overlapping lines are printed without wave gradation.

2. Gradation Form when there is a Difference in Lightness and Saturation of Colors A gradation form when there is a difference in lightness and saturation of colors may be divided into four cases, as illustrated in FIGS. 31A to 31E.

As illustrated in FIG. 31A, an image having a boundary line with a lightness difference of two or more levels is processed by applying a wave gradation along the boundary line. As illustrated in FIG. 31B, an image having a boundary line with a difference in hue in the same color is overprinted by applying a wave gradation along the hue boundary line thereof. As illustrated in FIG. 31C, in the case where the background image has two or more colors and a clear boundary line in the form of a straight line or a curve, images are overprinted by applying a linear or curved wave gradation along a boundary line. Also, in the case of an image with a large difference in hue or a large number of colors, such as a photographic image, overprinting is performed by applying a gradation by making the difference in hue large or the wave form larger in inverse proportion to the number of colors (the greater the difference in hue and the greater the number of colors, the smaller the change in the wave form).

Meanwhile, as another gradation pattern determining variable, setting of the length of the overlapping area, that is, the gradation overlapping length will be described as follows.

As illustrated in FIG. 32A, all monochromatic background images or photo images are overprinted by applying a wave gradation, and an overlapping length becomes longer for monochromatic images over 5 mm, and narrower for complex patterns or complex photo images.

As illustrated in FIG. 32B, in the case of an image having a boundary line with a difference in lightness of two levels or more or a background having a color close to white with high lightness, a linear overlapping gradation is applied along the boundary line, and the overlapping length becomes narrower as the lightness increases, and the overlapping length becomes longer as the lightness and saturation decrease. In addition, as illustrated in FIG. 32C, when the background color is white, there is no gradation overlapping interval, and when there are characters, overlapping lines are generated by avoiding overlapping characters, and only overlapping lines are printed without gradation.

In order to illustrate and describe a principle of determining a gradation pattern of an overlapping area image applied in the digital print image-connecting continuous printing method capable of hiding the stitching lines according to the present invention, the illustrated image classification categories are merely exemplified to illustrate and describe the principles of the present invention, and are not limited to these image classification and the gradation pattern determination categories. Combination examples of image classification categories (pattern determination variables) for determining overlapping area gradation patterns may be more diversely and densely classified and set in advance as the judgment data. The improvement of print quality when applying the digital print image-connecting continuous printing method capable of hiding the stitching line according to the present invention depends to various sophisticated and combined examples of image classification categories (pattern determination variables) for determining the overlapping area gradation patterns.

Hereinabove, although the preferred embodiments of the present invention have been illustrated and described above, the present invention is not limited to the aforementioned specific embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

The invention claimed is:

1. A device for digital print image-connecting continuous printing, comprising:

an un-winder roll for un-winding a printing fabric;

a re-winder roll for winding the printing fabric on which printing has been completed;

a printing engine provided between the un-winder roll and the re-winder roll, and including a blanket rotating while being in contact with a photo imaging plate and a print roller rotating while being in contact with the blanket; and a fabric direction switching mechanism for switching a transfer direction of the printing fabric passing between the blanket and the print roller into a forward direction or a reverse direction, wherein the printing engine prints a first divided image including a first overlapping area on a first fabric of the printing fabric when the transfer direction is the forward direction, locates only the first overlapping area printed on the first fabric under a second fabric of the printing fabric when the transfer direction is the reverse direction, and prints a second divided image including a second overlapping area on the second fabric to generate a unit image in which the first overlapping area and the second overlapping area overlap each other when the transfer direction is the forward direction.

2. The device for digital print image-connecting continuous printing of claim 1, wherein the fabric direction switching mechanism switches the transfer direction from the forward direction to the reverse direction when the printing of the first divided image is completed, moves the first fabric in the reverse direction until a starting point of the first overlapping area is located between the blanket and the printer roller, and switches the transfer direction from the reverse direction to the forward direction when the movement is completed.

3. The device for digital print image-connecting continuous printing of claim 1, wherein the first overlapping area and the second overlapping area have the same size and different printing densities.

4. The device for digital print image-connecting continuous printing of claim 1, wherein the first overlapping area is printed with a minus gradation technique in which the print density gradually decreases in an inverse logarithmic function as the printing progresses, and the second overlapping area is printed with a plus gradation technique in which the print density gradually increases in a logarithmic function as the printing progresses.

5. The device for digital print image-connecting continuous printing of claim 1, wherein the print density of the area where the first overlapping area and the second overlapping area overlap with each other is 110% to 170% of a print density of an area excluding the first overlapping area in the first divided image or a print density of an area excluding the second overlapping area in the second divided image.

6. A method for digital print image-connecting continuous printing comprising:

un-winding, by an un-winder roll, a printing fabric;

printing, by a printing engine, the printing fabric;

switching, by a fabric direction switching mechanism, a transfer direction of the printing fabric passing between the blanket and the print roller of the printing engine into a forward direction or a reverse direction; and winding, by a re-winder roll, the printing fabric on which printing has been completed, wherein the printing of the printing fabric comprises:

printing a first divided image including a first overlapping area on a first fabric of the printing fabric when the transfer direction is the forward direction;

locating only the first overlapping area printed on the first fabric under a second fabric of the printing fabric when the transfer direction is the reverse direction; and printing a second divided image including a second overlapping area on the second fabric to generate a unit image in which the first overlapping area and the second overlapping area overlap each other when the transfer direction is the forward direction.

7. The method for digital print image-connecting continuous printing of claim 6, wherein the switching of the transfer direction of the printing fabric into the forward direction or the reverse direction comprises:

switching the transfer direction from the forward direction to the reverse direction when the printing of the first divided image is completed;

moving the first fabric in the reverse direction until a starting point of the first overlapping area is located between the blanket and the printer roller; and switching the transfer direction from the reverse direction to the forward direction when the movement is completed.

8. The method for digital print image-connecting continuous printing of claim 6, wherein the first overlapping area and the second overlapping area have the same size and different printing densities.

9. The method for digital print image-connecting continuous printing of claim 6, wherein the first overlapping area is printed with a minus gradation technique in which the print density gradually decreases in an inverse logarithmic function as the printing progresses, and the second overlapping area is printed with a plus gradation technique in which the print density gradually increases in a logarithmic function as the printing progresses.

10. The method for digital print image-connecting continuous printing of claim 6, wherein the print density of the area where the first overlapping area and the second overlapping area overlap with each other is 110% to 170% of a print density of an area excluding the first overlapping area in the first divided image or a print density of an area excluding the second overlapping area in the second divided image.

* * * * *